(12) United States Patent
Kishi et al.

(10) Patent No.: US 12,154,723 B2
(45) Date of Patent: Nov. 26, 2024

(54) MULTILAYER CERAMIC CAPACITOR

(71) Applicant: Murata Manufacturing Co., Ltd., Nagaokakyo (JP)

(72) Inventors: Kotaro Kishi, Nagaokakyo (JP); Satoshi Muramatsu, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 10 days.

(21) Appl. No.: 17/896,119

(22) Filed: Aug. 26, 2022

(65) Prior Publication Data

US 2023/0083171 A1    Mar. 16, 2023

(30) Foreign Application Priority Data

Sep. 16, 2021 (JP) .................. 2021-151502

(51) Int. Cl.
| | |
|---|---|
| *H01G 4/232* | (2006.01) |
| *H01G 4/012* | (2006.01) |
| *H01G 4/30* | (2006.01) |
| *H01G 4/12* | (2006.01) |

(52) U.S. Cl.
CPC ............ *H01G 4/232* (2013.01); *H01G 4/012* (2013.01); *H01G 4/30* (2013.01); *H01G 4/1227* (2013.01); *H01G 4/1236* (2013.01)

(58) Field of Classification Search
CPC .......... H01G 4/232; H01G 4/012; H01G 4/30; H01G 4/1227; H01G 4/1236
See application file for complete search history.

(56) References Cited

U.S. PATENT DOCUMENTS

| | | | |
|---|---|---|---|
| 9,775,232 B2* | 9/2017 | Park | H01G 4/1227 |
| 10,910,161 B2* | 2/2021 | Yang | H01G 4/30 |
| 11,094,460 B2* | 8/2021 | Yang | H01G 4/228 |
| 11,282,646 B2* | 3/2022 | Jung | H01G 4/12 |
| 11,315,732 B2* | 4/2022 | Jung | H01G 4/2325 |
| 2012/0194963 A1 | 8/2012 | Kuroda et al. | |

(Continued)

FOREIGN PATENT DOCUMENTS

| | | |
|---|---|---|
| CN | 111048311 A | 4/2020 |
| JP | 2012156471 A | 8/2012 |

(Continued)

OTHER PUBLICATIONS

Office Action in JP 2021-151502, mailed Jan. 23, 2024, 2 pages.

(Continued)

*Primary Examiner* — Dion R. Ferguson
(74) *Attorney, Agent, or Firm* — Keating & Bennett, LLP

(57) ABSTRACT

In a multilayer ceramic capacitor, when a dimension in a length direction between a first end surface and a second end surface of a multilayer body is defined as l, a dimension in a width direction between a first lateral surface and a second lateral surface of the multilayer body is defined as w, and a dimension in a height direction between a first main surface and a second main surface of the multilayer body is defined as t, a dimensional relationship of $w>l>t$ is satisfied, and a fourth surface portion and a fifth surface portion of the first external electrode, and a ninth surface portion and a tenth surface portion of the second external electrode each include an opening portion at which a surface of the multilayer body is exposed.

20 Claims, 28 Drawing Sheets

(56) References Cited

U.S. PATENT DOCUMENTS

| | | | |
|---|---|---|---|
| 2018/0218840 A1 | 8/2018 | Watabe et al. | |
| 2019/0326058 A1* | 10/2019 | Lee | H01G 4/232 |
| 2019/0385795 A1* | 12/2019 | Yang | H01G 4/30 |
| 2020/0066444 A1* | 2/2020 | Yang | H01G 4/12 |
| 2020/0105472 A1* | 4/2020 | Song | H01G 4/236 |
| 2020/0118755 A1* | 4/2020 | Yajima | H01G 4/232 |
| 2021/0065980 A1* | 3/2021 | Jung | H01G 4/232 |
| 2021/0249194 A1 | 8/2021 | Sasaki | |
| 2023/0083171 A1* | 3/2023 | Kishi | H01G 4/232 |
| | | | 361/301.4 |

FOREIGN PATENT DOCUMENTS

| | | |
|---|---|---|
| JP | 2018121011 A | 8/2018 |
| JP | 2020-057753 A | 4/2020 |
| JP | 2020-061524 A | 4/2020 |
| JP | 2021128969 A | 9/2021 |

OTHER PUBLICATIONS

Official Communication issued in corresponding Chinese Patent Application No. 202210851081.0, mailed on Oct. 12, 2024, 6 pages.

* cited by examiner

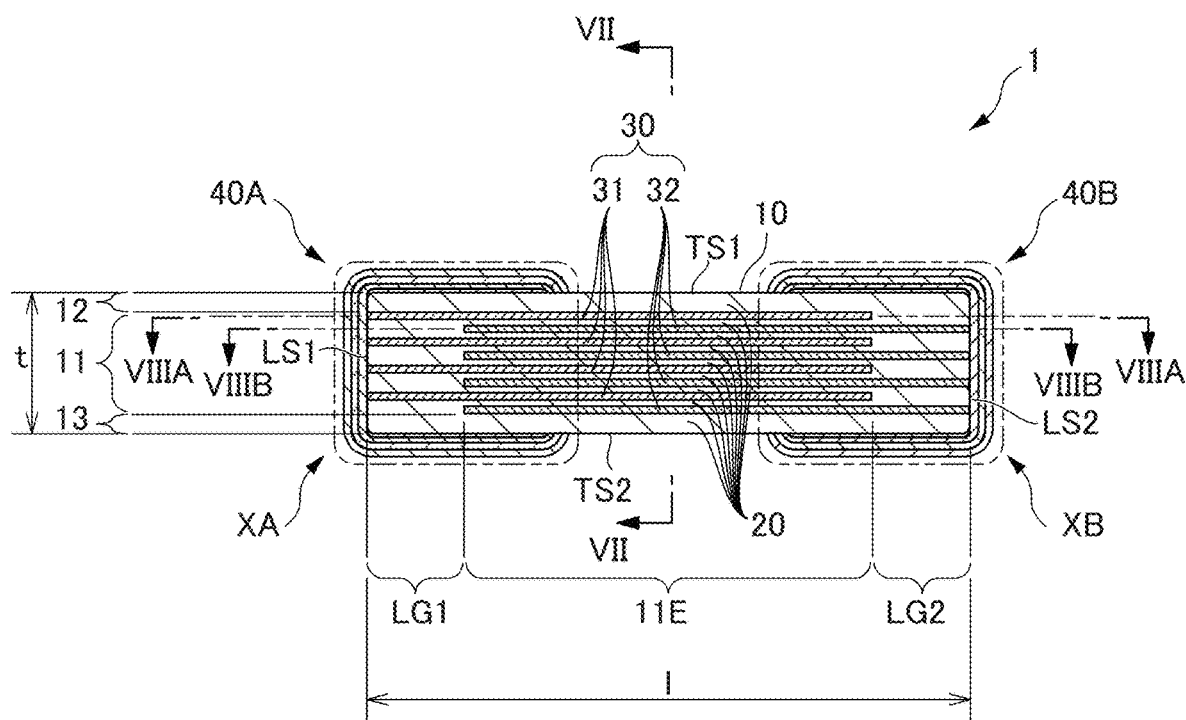
FIG. 6
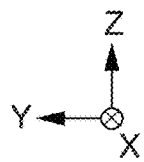

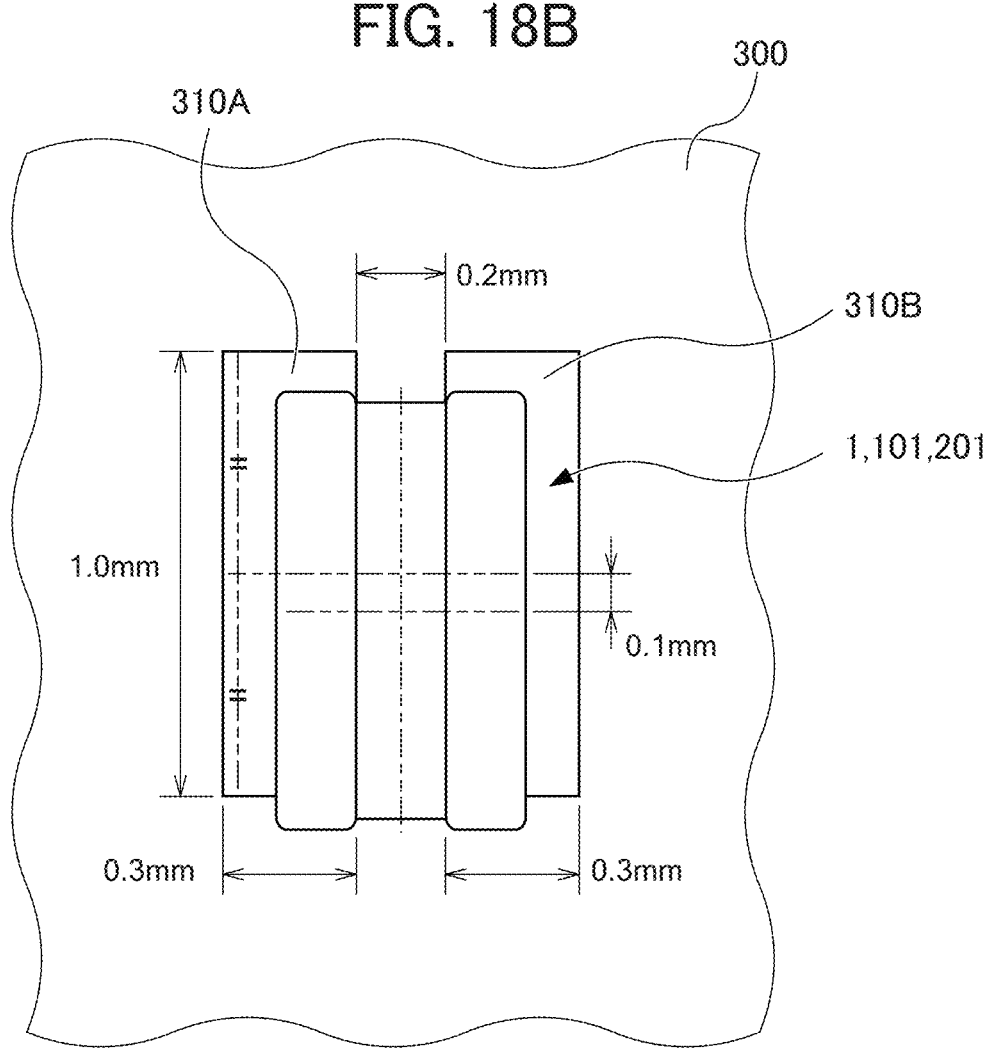

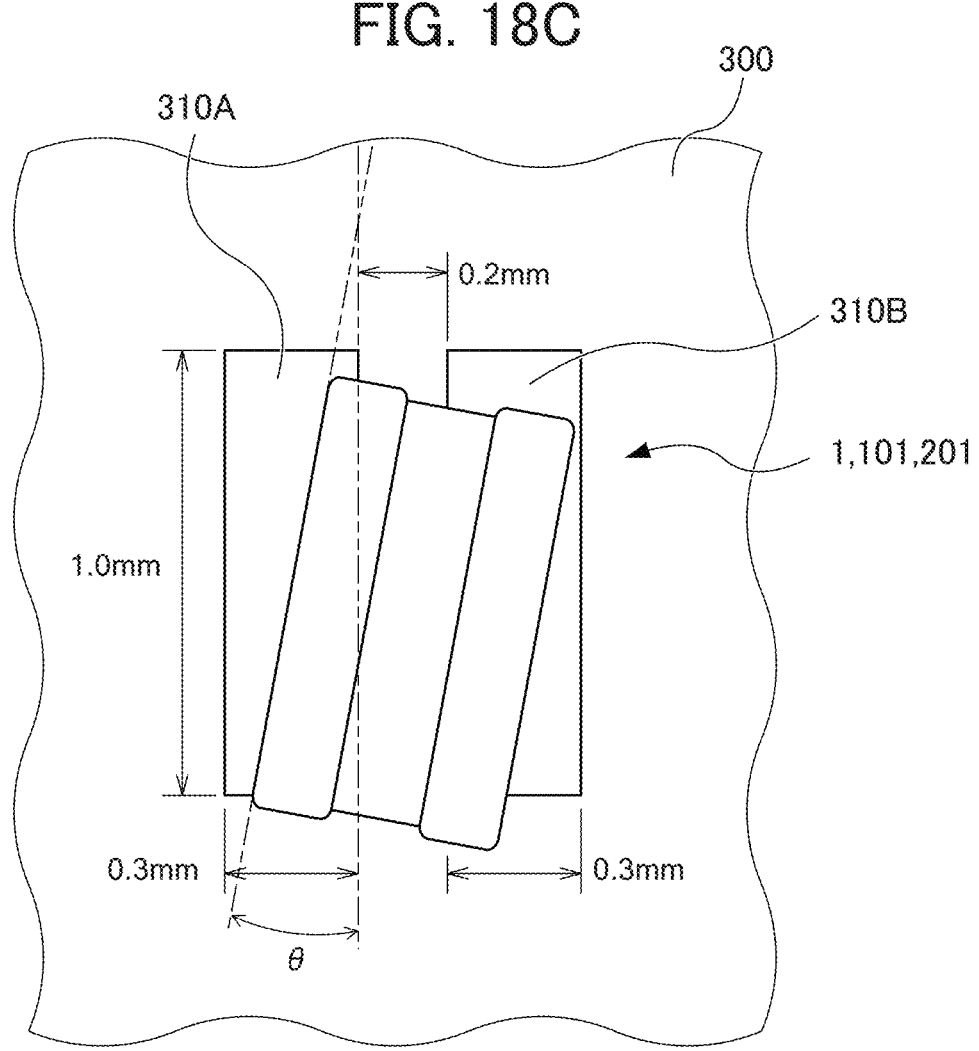

MULTILAYER CERAMIC CAPACITOR

CROSS REFERENCE TO RELATED APPLICATIONS

This application is based on and claims the benefit of priority to Japanese Patent Application No. 2021-151502 filed on Sep. 16, 2021. The entire contents of this application are hereby incorporated herein by reference.

BACKGROUND OF THE INVENTION

1. Field of the Invention

The present invention relates to a multilayer ceramic capacitor.

2. Description of the Related Art

Conventionally, multilayer ceramic capacitors are known. A typical multilayer ceramic capacitor has a rectangular parallelepiped-shaped multilayer body with the dimension in the length direction L longer than the dimension in the width direction W. External electrodes are provided at both ends of the multilayer body in the length direction L. On the other hand, in order to reduce the equivalent series inductance (ESL), an LW reversed multilayer ceramic capacitor is known in which the relationship between the length direction L and the width direction W of the multilayer body is reversed (see, for example, Japanese Unexamined Patent Application Publication Nos. 2020-57753 and 2020-61524).

Furthermore, in recent years, as the mounting density of a board increases, the mounting area in a multilayer ceramic capacitor decreases. Therefore, the mounting configuration of Package on Package (PoP) has been adopted, and the demand for the Land Side Capacitor (LSC) type-mounted multilayer ceramic capacitor on the lower end portion of the board has been increasing. As a multilayer ceramic capacitor mounted in the LSC type, a thin multilayer ceramic capacitor having a reduced height in the height direction is required.

Japanese Unexamined Patent Application Publication No. 2020-61524 discloses an LW reversed type multilayer ceramic electronic component. In the LW reversed type multilayer ceramic electronic component, at least one edge of the fourth surface portion and the fifth surface portion of an external electrode has a recess portion recessed from the edge toward the first surface portion, and both lateral portions of the recess portion in the third direction function as a covering portion covering the ridges of the two surfaces in the second direction of the component body.

However, in the multilayer ceramic electronic component disclosed in Japanese Unexamined Patent Application Publication No. 2020-61524, it is presumed that, due to the formation position, thickness variation, etc. of a base conductor layer and a covering conductor layer provided on the base conductor layer, the area and the shape of the covering portion covering the ridges of the two surfaces in the second direction of the component body vary. Here, when mounting an LW reversed type multilayer ceramic electronic component using solder on the mounting board, depending on the lateral differences in the area and shape of the covering portion, the wetting manner of the solder with respect to the coating portion is changed on each surface, and there is a possibility that a difference occurs in the addition of the tensile stress of the solder. This may deteriorate the self-alignment effect. As a result, the multilayer ceramic electronic component may tend to rotate or tilt, which may deteriorate the mountability. Furthermore, the lands of the board on which an LW reversed type multilayer ceramic electronic component is mounted have short distances therebetween. Therefore, there is a possibility that the self-alignment effect is deteriorated. When the multilayer ceramic electronic component is greatly rotated, one external electrode is mounted on lands having different polarities in a manner straddling the lands, and there is a possibility that a short-circuit failure occurs.

SUMMARY OF THE INVENTION

Preferred embodiments of the present invention provide LW reversed multilayer ceramic capacitors that are each able to reduce or prevent deterioration of self-alignment effect and perform stable mounting.

A multilayer ceramic capacitor according to a preferred embodiment of the present disclosure includes a multilayer body including a plurality of laminated dielectric layers and a plurality of internal electrode layers laminated on the dielectric layers, the multilayer body further including a first main surface and a second main surface which oppose each other in a height direction, a first end surface and a second end surface which oppose each other in a length direction perpendicular or substantially perpendicular to the height direction, and a first lateral surface and a second lateral surface which oppose each other in a width direction perpendicular or substantially perpendicular to the height direction and the length direction, a first external electrode including a first surface portion on the first end surface, at least one of a second surface portion on a portion of the first main surface and a third surface portion on a portion of the second main surface, a fourth surface portion on a portion of the first lateral surface, and a fifth surface portion on a portion of the second lateral surface, and a second external electrode including a sixth surface portion on the second end surface, at least one of a seventh surface portion on a portion of the first main surface and an eighth surface portion on a portion of the second main surface, a ninth surface portion on a portion of the first lateral surface, and a tenth surface portion on a portion of the second lateral surface, wherein, in a case in which a dimension in the length direction between the first end surface and the second end surface of the multilayer body is defined as l, a dimension in the width direction between the first lateral surface and the second lateral surface of the multilayer body is defined as w, and a dimension in the height direction between the first main surface and the second main surface of the multilayer body is defined as t, a dimensional relationship of w>l>t is satisfied, and the fourth surface portion, the fifth surface portion, the ninth surface portion, and the tenth surface portion each include an opening portion at which a surface of the multilayer body is exposed.

According to preferred embodiments of the present invention, it is possible to provide LW reversed multilayer ceramic capacitors that are each able to reduce or prevent deterioration of self-alignment effect and perform stable mounting.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6 is a cross-sectional view taken along the line VI-VI of the multilayer ceramic capacitor shown in FIG. 4.

FIG. 18B is a diagram for explaining how the mountability of Experimental Example is evaluated.

FIG. 18C is a diagram for explaining how the mountability of Experimental Example is evaluated.

DETAILED DESCRIPTION OF THE PREFERRED EMBODIMENTS

Preferred embodiments of the present invention will be described below with reference to the accompanying drawings.

Figure 1:
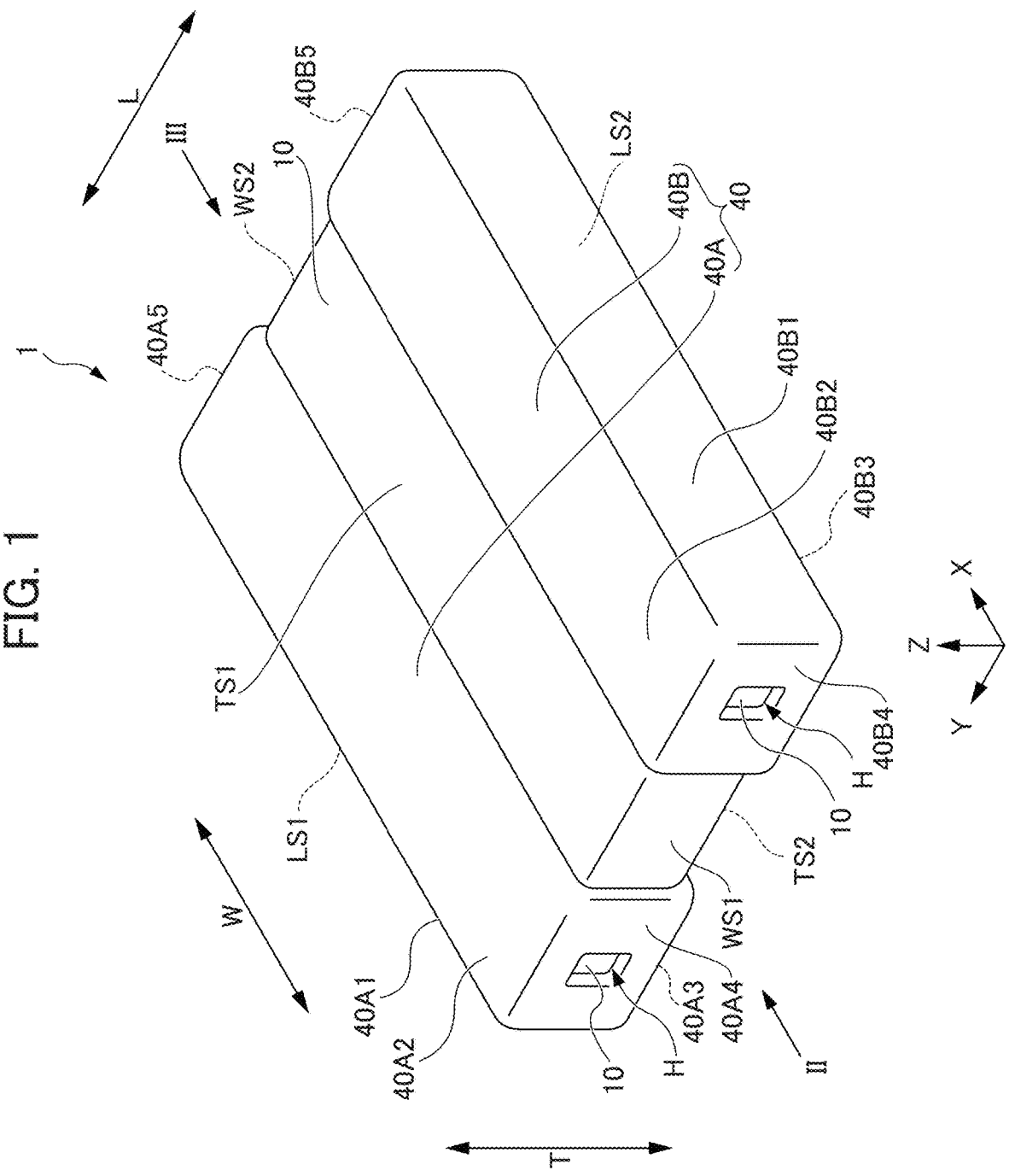
FIG. 1 is an external perspective view of a multilayer ceramic capacitor according to a preferred embodiment of the present invention.
Figure 2:
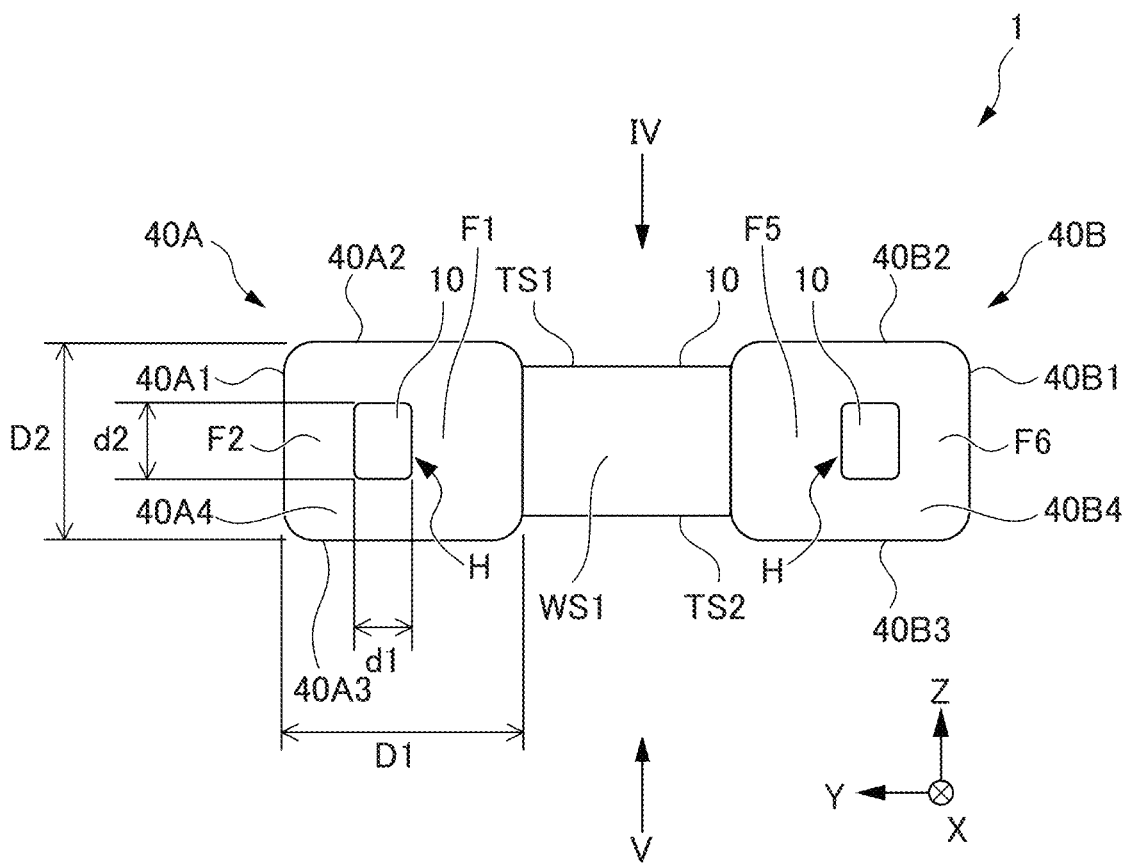
FIG. 2 is an arrow view when viewing a first lateral surface of the multilayer ceramic capacitor shown in FIG. 1 along the direction of the arrow II.
Figure 3:
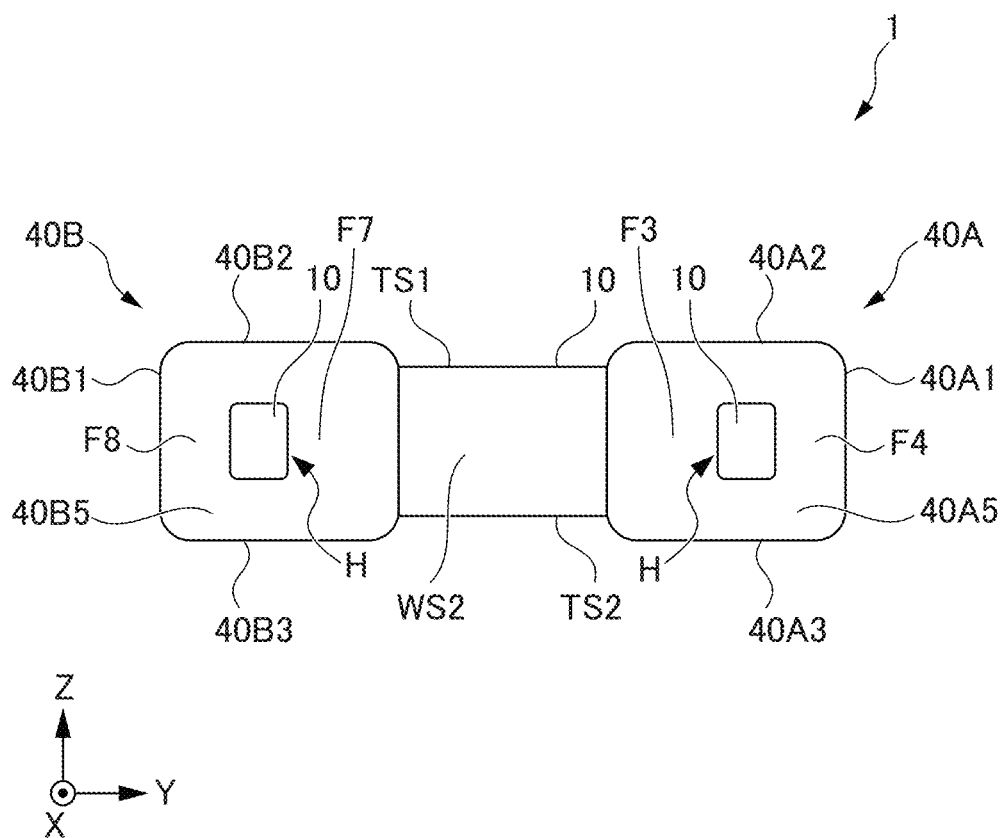
FIG. 3 is an arrow view when viewing a second lateral surface of the multilayer ceramic capacitor shown in FIG. 1 along the direction of the arrow III.
Figure 4:
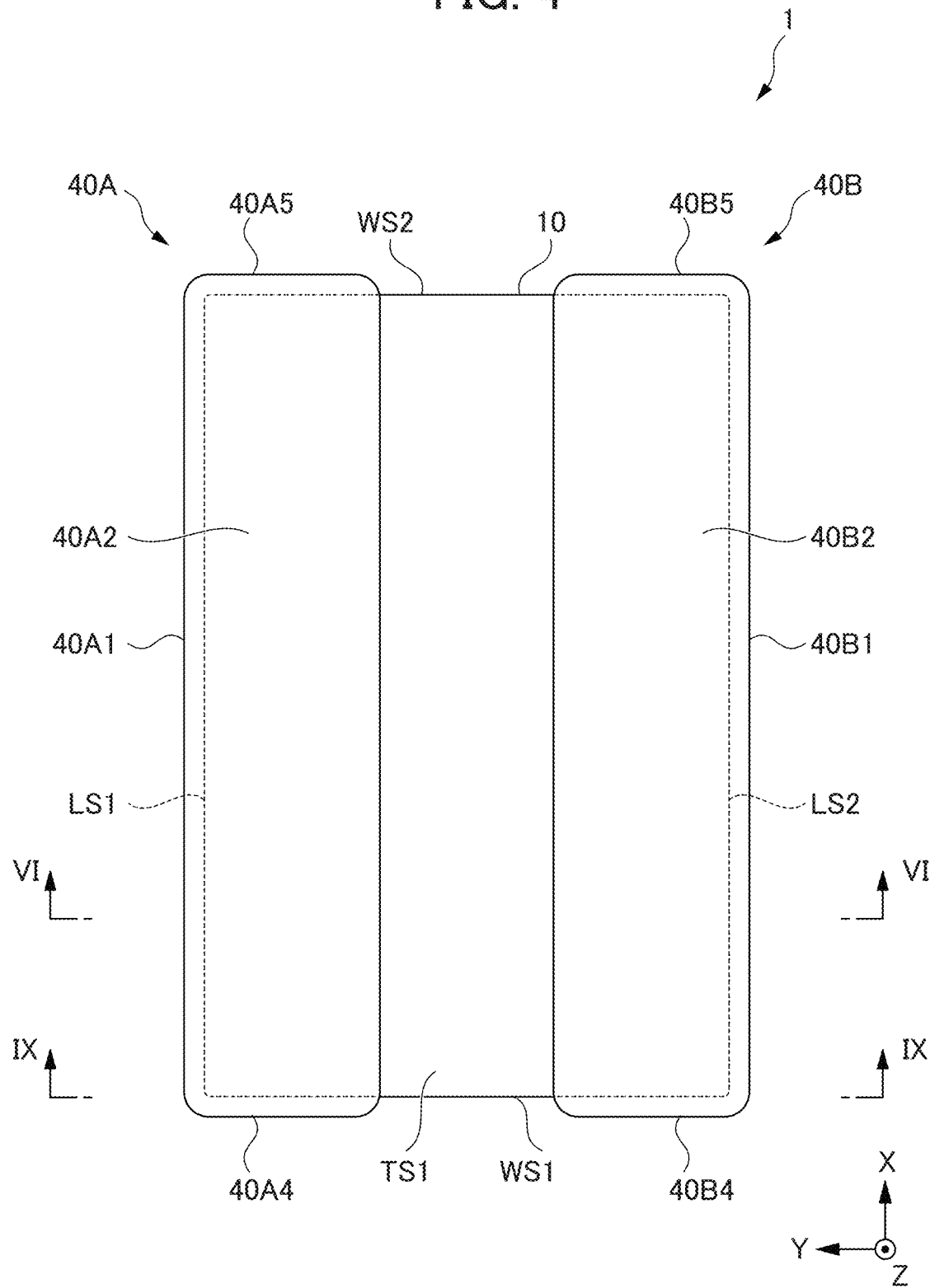
FIG. 4 is an arrow view when viewing a first main surface of the multilayer ceramic capacitor shown in FIG. 2 along the direction of the arrow IV.
Figure 5:
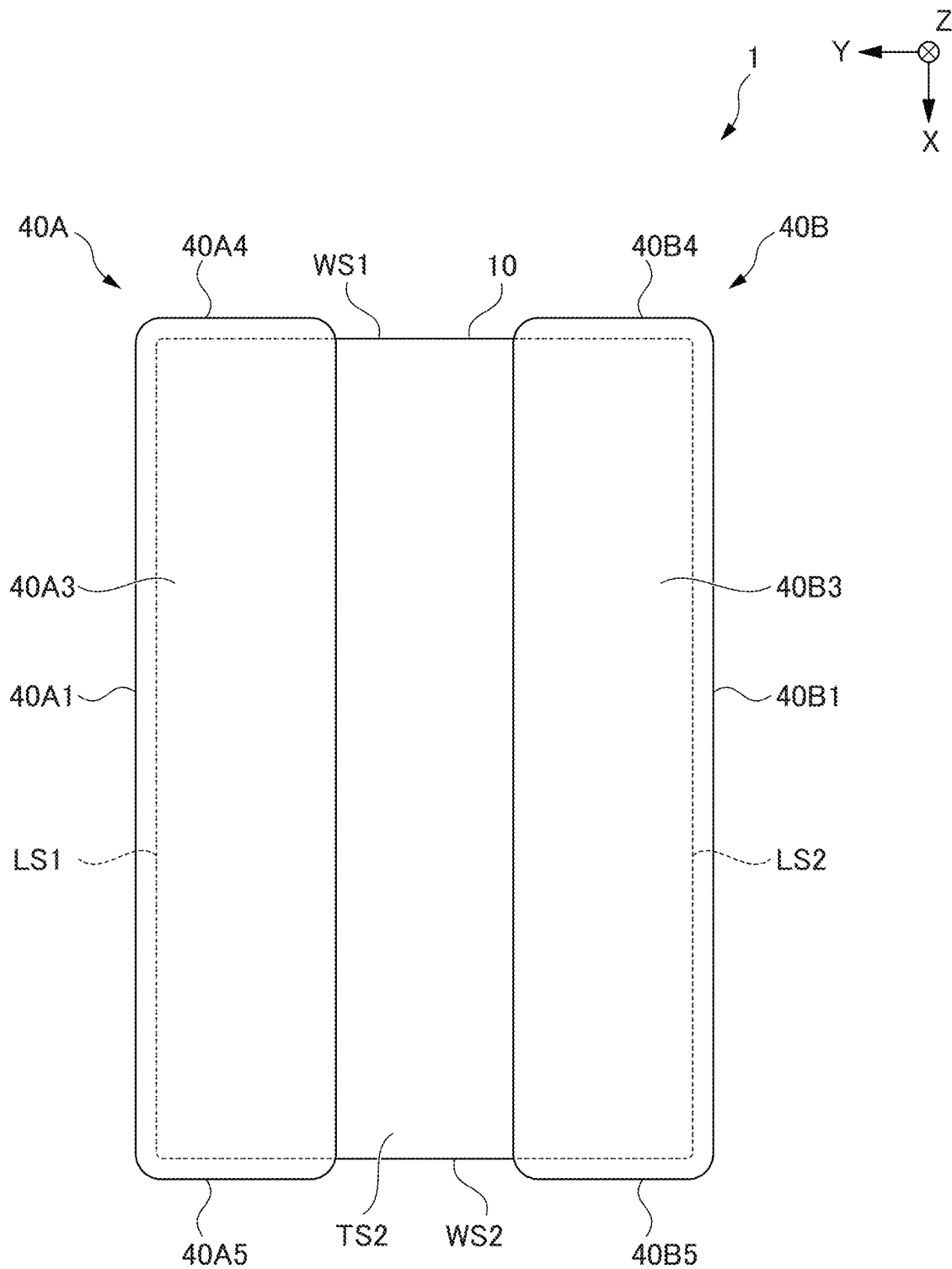
FIG. 5 is an arrow view when viewing a second main surface of the multilayer ceramic capacitor shown in FIG. 2 along the direction of the arrow V.
Figure 7:
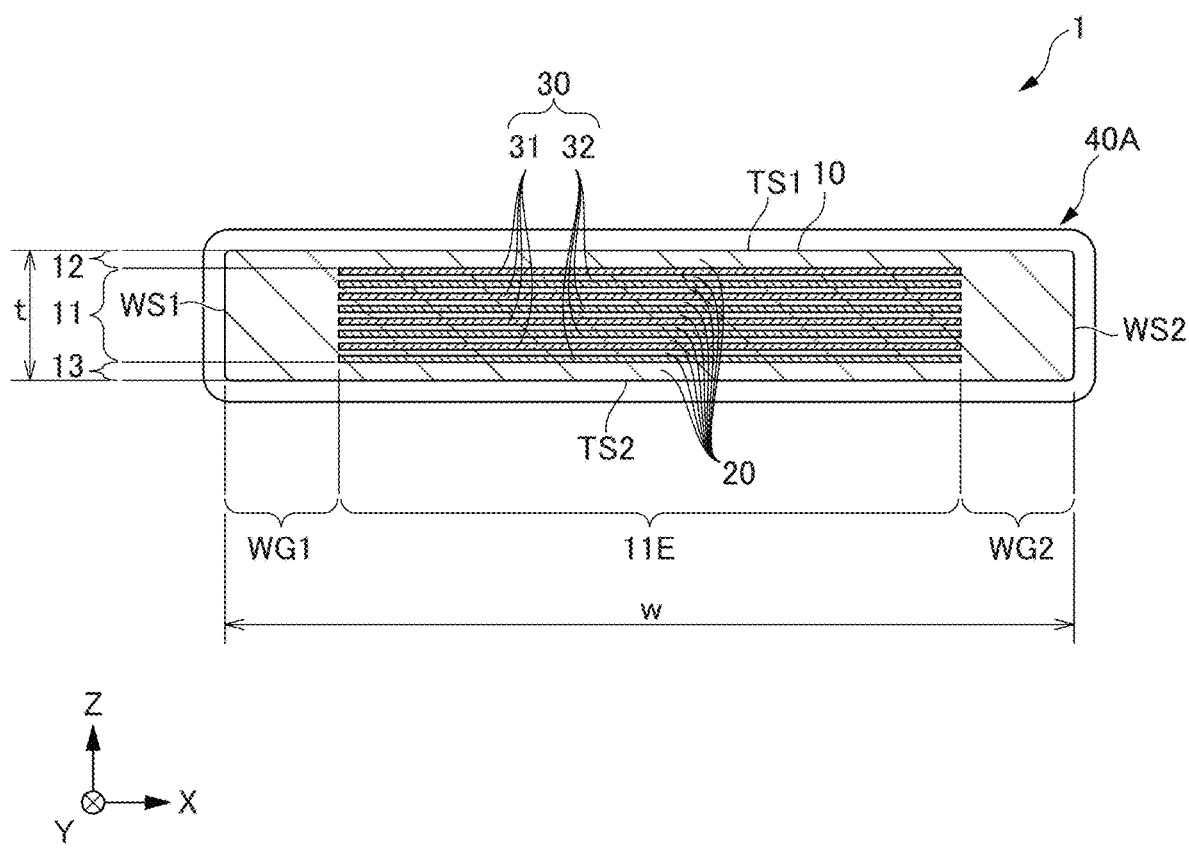
FIG. 7 is a cross-sectional view taken along the line VII-VII of the multilayer ceramic capacitor shown in FIG. 6.
Figure 8A:
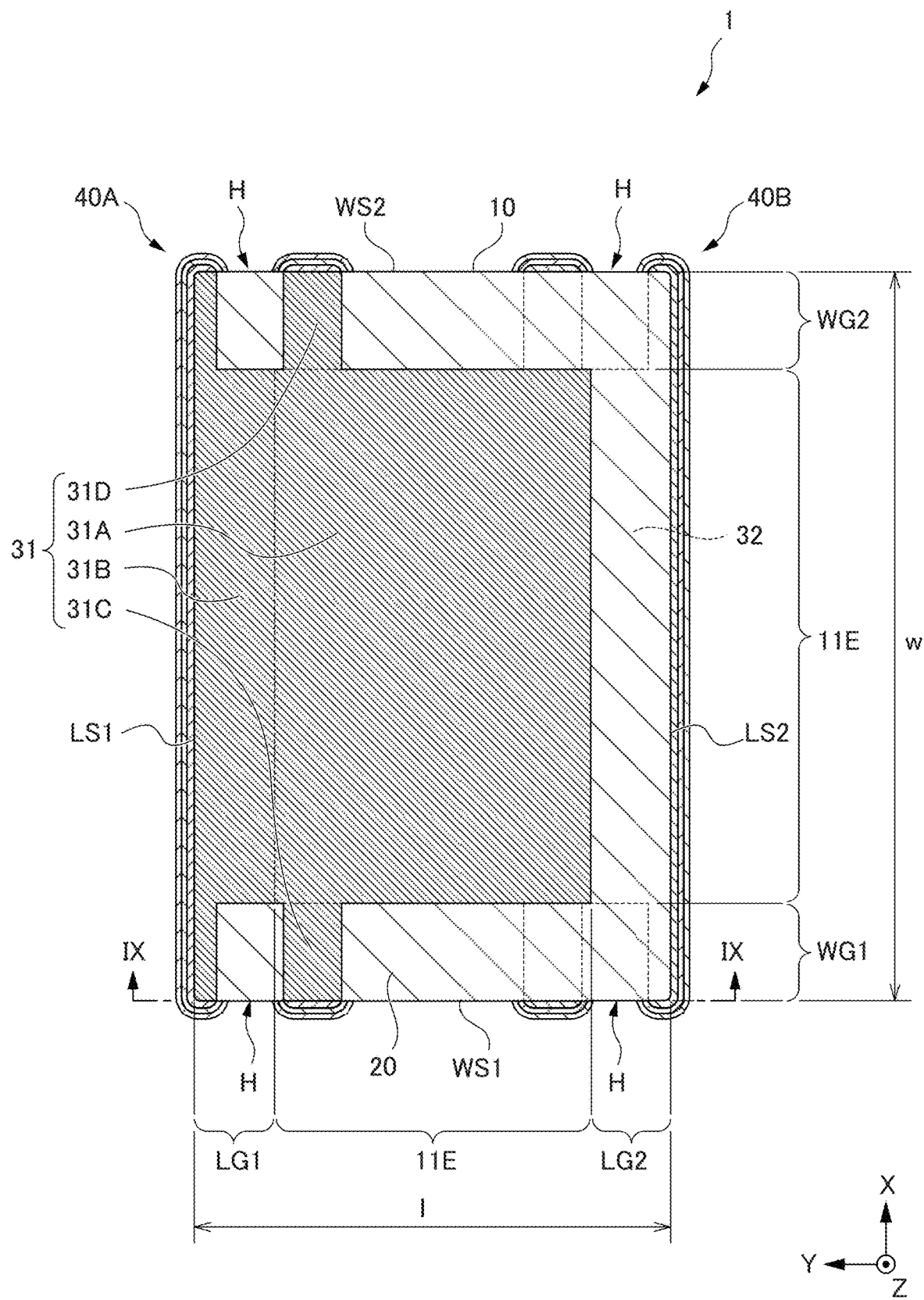
FIG. 8A is a cross-sectional view taken along the line VIIIA-VIIIA of the multilayer ceramic capacitor shown in FIG. 6, and shows a first internal electrode layer.
Figure 8B:
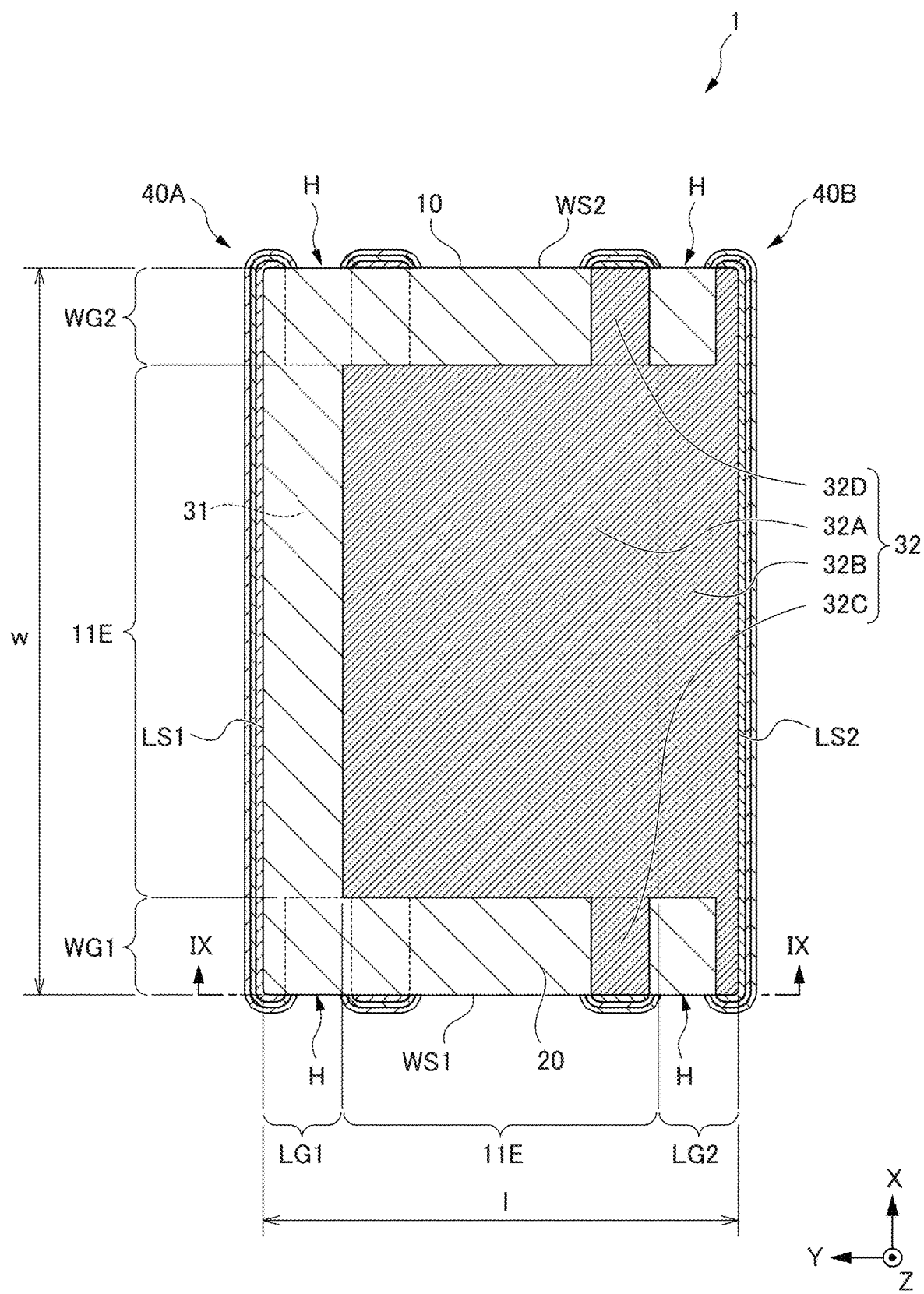
FIG. 8B is a cross-sectional view taken along the line VIIIB-VIIIB of the multilayer ceramic capacitor shown in FIG. 6, and shows a second internal electrode layer.
Figure 9:
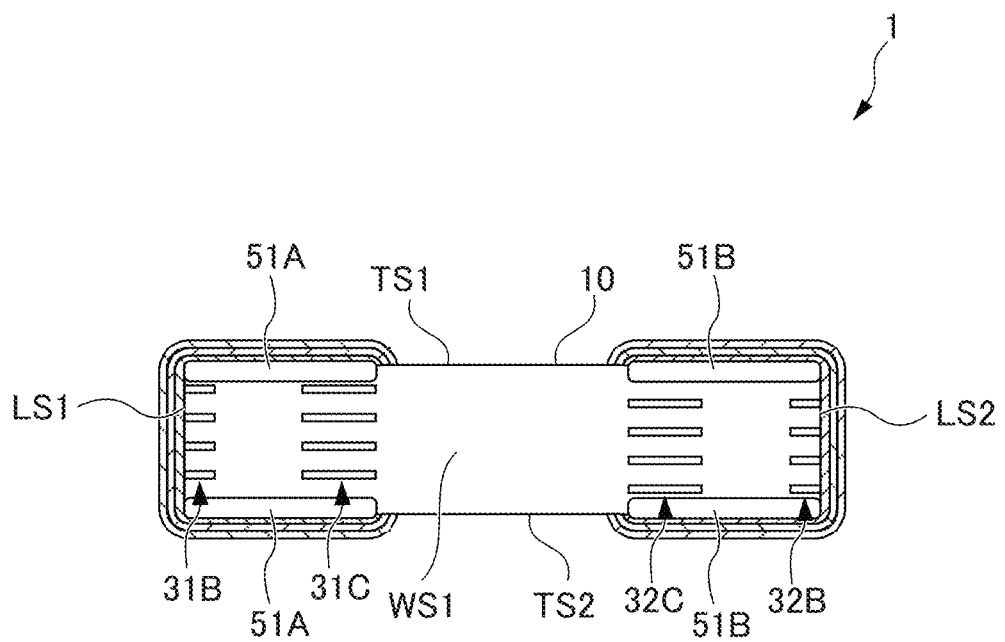
FIG. 9 is a cross-sectional view taken along the line IX-IX of the multilayer ceramic capacitor shown in FIG. 4, and shows a first lateral surface of the multilayer body.
Figure 10A:
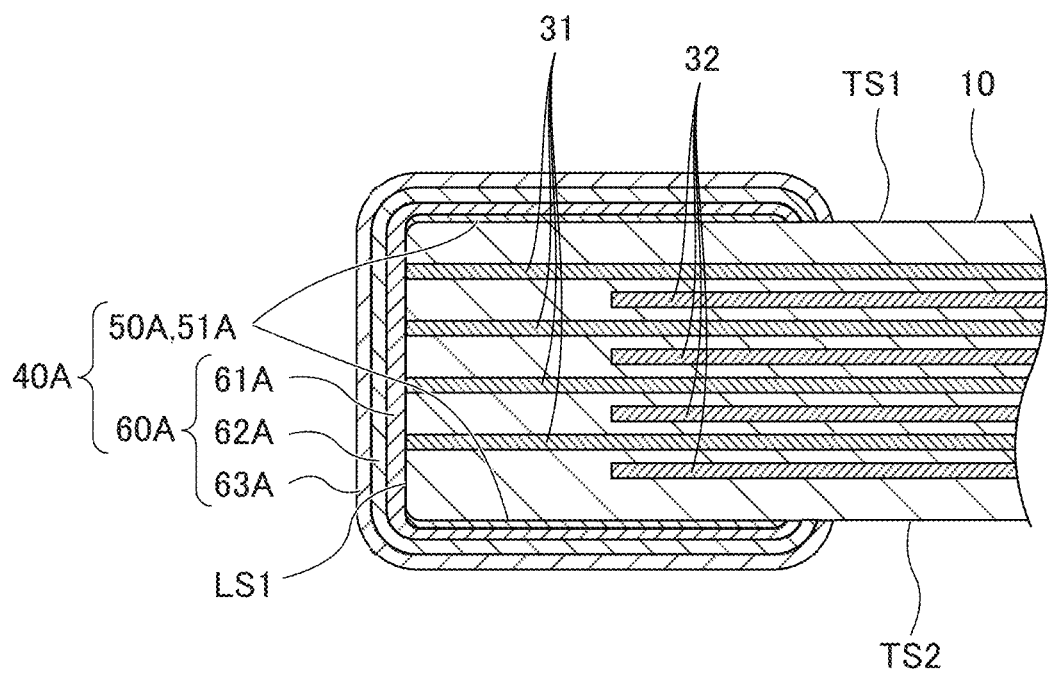
FIG. 10A is an enlarged view of an XA portion in FIG. 6, and shows a cross section of a first external electrode.
Figure 10B:
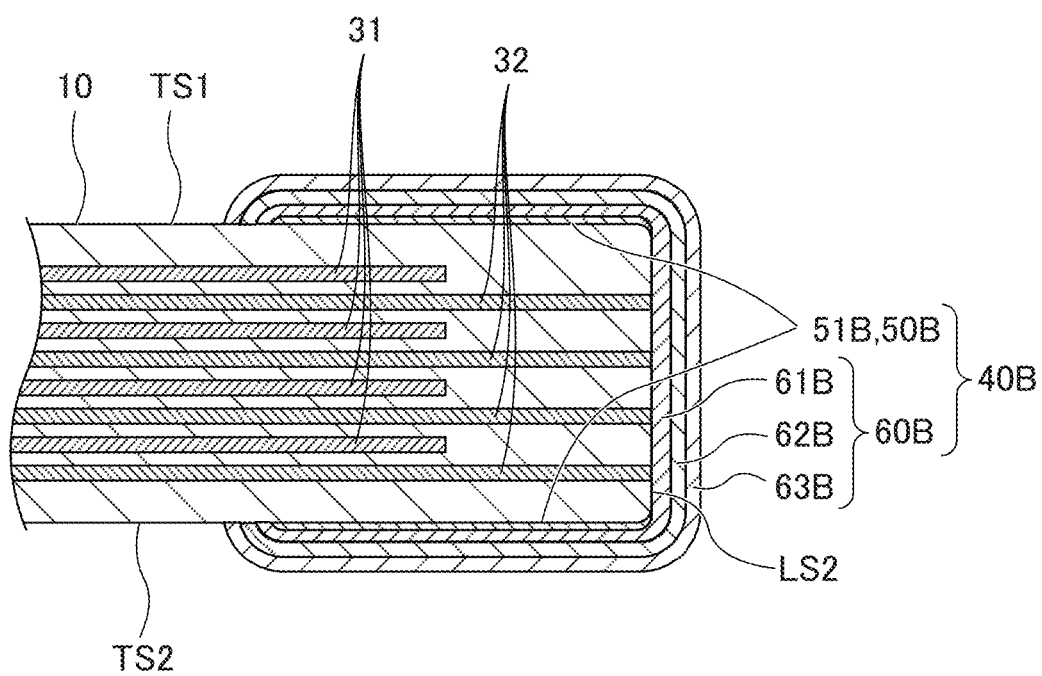
FIG. 10B is an enlarged view of a portion XB in FIG. 6, and shows a cross section of a second external electrode.

Hereinafter, a multilayer ceramic capacitor 1 according to a preferred embodiment of the present invention will be described with reference to the drawings. However, the present invention is not limited to the following preferred embodiments, and can be applied by modifying where appropriate within a scope not changing the gist of the present invention. Preferred embodiments of the present invention also include combinations of two or more of the individual preferred embodiments described below. FIG. 1 is an external perspective view of the multilayer ceramic capacitor 1 according to a preferred embodiment of the present invention. FIG. 2 is an arrow view when viewing a first lateral surface WS1 of the multilayer ceramic capacitor 1 shown in FIG. 1 along the direction of the arrow II. FIG. 3 is an arrow view when viewing a second lateral surface WS2 of the multilayer ceramic capacitor 1 shown in FIG. 1 along the direction of the arrow III. FIG. 4 is an arrow view when viewing a first main surface TS1 of the multilayer ceramic capacitor 1 shown in FIG. 2 along the direction of the arrow IV. FIG. 5 is an arrow view when viewing a second main surface TS2 of the multilayer ceramic capacitor 1 shown in FIG. 2 along the direction of the arrow V. FIG. 6 is a cross-sectional view taken along the line VI-VI of the multilayer ceramic capacitor 1 shown in FIG. 4. FIG. 7 is a cross-sectional view taken along the line VII-VII of the multilayer ceramic capacitor 1 shown in FIG. 6. FIG. 8A is a cross-sectional view taken along the line VIIIA-VIIIA of the multilayer ceramic capacitor 1 shown in FIG. 6. FIG. 8B is a cross-sectional view taken along the line VIIIB-VIIIB of the multilayer ceramic capacitor 1 shown in FIG. 6. FIG. 9 is a cross-sectional view taken along the line IX-IX of the multilayer ceramic capacitor shown in FIG. 4, and shows the first lateral surface WS1 of the multilayer body 10. FIG. 10A is an enlarged view of an XA portion in FIG. 6, and shows a cross section of a first external electrode 40A. FIG. 10B is an enlarged view of an XB portion in FIG. 6, and shows a cross section of a second external electrode 40B.

The multilayer ceramic capacitor 1 includes a multilayer body 10 and external electrodes 40.

FIGS. 1 to 9 each show the XYZ Cartesian coordinate system. The length direction L of the multilayer ceramic capacitor 1 and the multilayer body 10 corresponds to the Y-direction. The width direction W of the multilayer ceramic capacitor 1 and the multilayer body 10 corresponds to the X-direction. The height (lamination) direction T of the multilayer ceramic capacitor 1 and multilayer body 10 corresponds to the Z-direction. The cross section shown in FIG. 6 is also referred to as an LT cross section. The cross section shown in FIG. 7 is also referred to as a WT cross section. The cross-sections shown in FIG. 8A and FIG. 8B are also referred to as an LW cross section.

As shown in FIGS. 1 to 5, the multilayer body 10 includes a first main surface TS1 and a second main surface TS2 opposing in the height direction T, a first end surface LS1 and a second end surface LS2 opposing in the length direction L orthogonal or substantially orthogonal to the height direction T, and a first lateral surface WS1 and a second lateral surface WS2 opposing in the width direction W orthogonal or substantially orthogonal to the height direction T and the length direction L.

The multilayer body 10 has a rectangular or substantially rectangular parallelepiped shape. It is preferable that the corners and ridges of multilayer body 10 are rounded. The corners are portions where the three surfaces of the multilayer body intersect, and the ridges are portions where the two surfaces of the multilayer body intersect. Irregularities or the like may be provided on a portion or the entire surface of the multilayer body 10, for example.

As shown in FIGS. 6 and 7, the multilayer body 10 includes an inner layer portion 11, and a first main surface-side outer layer portion 12 and a second main surface-side outer layer portion 13 that sandwich the inner layer portion 11 in the height direction T.

The inner layer portion 11 includes a plurality of dielectric layers 20 and a plurality of internal electrode layers 30. The inner layer portion 11 includes the internal electrode layers 30 from the internal electrode layer 30 located closest to the first main surface TS1 side to the internal electrode layer 30 located closest to the second main surface TS2 side in the height direction T. In the inner layer portion 11, the plurality of internal electrode layers 30 are opposed to each other with a dielectric layer 20 interposed therebetween. The inner layer portion 11 generates capacitance, and is defined as and substantially defines and functions as a capacitor. The inner layer portion 11 is also referred to as an active layer portion.

The plurality of dielectric layers 20 include a dielectric material. The dielectric material is a ceramic material, for example. The dielectric material may be a dielectric ceramic including components such as, for example, $BaTiO_3$, $CaTiO_3$, $SrTiO_3$ or $CaZrO_3$. When these components are the main components, sub-components having a content smaller than that of the main components, such as, for example, a Mn compound, an Fe compound, a Cr compound, a Co compound, and a Ni compound, may be added depending on the characteristics of a desired multilayer body.

The thickness of the dielectric layer 20 is preferably about 0.5 µm or more and about 10 µm or less, for example. The number of dielectric layers 20 to be laminated is preferably 15 or more and 700 or less, for example. The number of the dielectric layers 20 is the total number of dielectric layers in the inner layer portion 11 and the number of dielectric layers in the first main surface-side outer layer portion 12 and the second main surface-side outer layer portion 13.

The plurality of internal electrode layers 30 include a plurality of first internal electrode layers 31 and a plurality of second internal electrode layers 32. The first internal electrode layers 31 are provided on the plurality of dielectric layers 20 and extend to the first end surface LS1. The second internal electrode layers 32 are provided on the plurality of dielectric layers 20 and extend to the second end surface LS2. The plurality of first internal electrode layers 31 and the plurality of second internal electrode layers 32 are alternately provided in the height direction T of the multilayer body 10 with the dielectric layer 20 interposed therebetween. The first internal electrode layer 31 and the second internal electrode layer 32 sandwich the dielectric layer 20.

As shown in FIG. 8A, the first internal electrode layer 31 includes a first counter electrode portion 31A, a first extension portion 31B, a second extension portion 31C, and a third extension portion 31D. The first counter electrode portion 31A is opposed to the second internal electrode layer 32. The first extension portion 31B extends from the first counter electrode portion 31A to the first end surface LS1, a portion of the first lateral surface WS1, and a portion of the second lateral surface WS2. The second extension portion 31C extends from the first counter electrode portion 31A to a portion of the first lateral surface WS1. The third extension portion 31D extends from the first counter electrode portion 31A to a portion of the second lateral surface WS2.

The first counter electrode portion 31A is located inside the multilayer body 10. The first extension portion 31B is connected to the first counter electrode portion 31A, and exposed at the first end surface LS1, a portion of the first lateral surface WS1, and a portion of the second lateral surface WS2. The second extension portion 31C is connected to the first counter electrode portion 31A, and exposed at a portion of the first lateral surface WS1. The third extension portion 31D is connected to the first counter electrode portion 31A, and exposed at a portion of the second lateral surface WS2.

The second extension portion 31C is spaced apart in the length direction L from the portion of the first extension portion 31B extending to the first lateral surface WS1. The third extension portion 31D is spaced apart in the length direction L from the portion of the first extension portion 31B extending to the second lateral surface WS2.

As shown in FIG. 8B, the second internal electrode layer 32 includes a second counter electrode portion 32A, a fourth extension portion 32B, a fifth extension portion 32C, and a sixth extension portion 32D. The second counter electrode portion 32A is opposed to the first internal electrode layer 31. The fourth extension portion 32B extends from the second counter electrode portion 32A to the second end surface LS2, a portion of the first lateral surface WS1, and a portion of the second lateral surface WS2. The fifth extension portion 32C extends from the second counter electrode portion 32A to a portion of the first lateral surface WS1. The sixth extension portion 32D extends from the second counter electrode portion 32A to a portion of the second lateral surface WS2.

The second counter electrode portion 32A is located inside the multilayer body 10. The fourth extension portion 32B is connected to the second counter electrode portion 32A, and exposed at the second end surface LS2, a portion of the first lateral surface WS1, and a portion of the second lateral surface WS2. The fifth extension portion 32C is connected to the second counter electrode portion 32A, and exposed at a portion of the first lateral surface WS1. The sixth extension portion 32D is connected to the second counter electrode portion 32A, and exposed at a portion of the second lateral surface WS2.

The fifth extension portion 32C is spaced apart in the length direction L from the portion extending to the first lateral surface WS1 of the fourth extension portion 32B. The sixth extension portion 32D is spaced apart in the length direction L from the portion extending to the second lateral surface WS2 of the fourth extension portion 32B.

FIG. 9 is a cross-sectional view taken along the line IX-IX of the multilayer ceramic capacitor 1 shown in FIG. 4, and shows the first lateral surface WS1 of the multilayer body 10. Also in FIGS. 8A and 8B, the line IX-IX showing the location of the cross-sectional view of FIG. 9 is shown. As shown in FIG. 9, at the first lateral surface WS1 of the multilayer body 10, the first extension portion 31B and the second extension portion 31C of the first internal electrode layer 31, and the fourth extension portion 32B and the fifth extension portion 32C of the second internal electrode layer 32 are exposed. The first extension portion 31B and the second extension portion 31C are exposed at the surface of the multilayer body 10, while the former is spaced apart from the latter. The fourth extension portion 32B and the fifth extension portion 32C are exposed at the surface of the multilayer body 10, while the former is spaced apart from the latter.

Although not shown, similarly to the first lateral surface WS1 side, the first extension portion 31B and the third extension portion 31D of the first internal electrode layer 31, and the fourth extension portion 32B and the sixth extension portion 32D of the second internal electrode layer 32 are exposed at the second lateral surface WS2 side. The first extension portion 31B and the third extension portion 31D are exposed at the surface of the multilayer body 10, while the former is spaced apart from the latter. The fourth extension portion 32B and the sixth extension portion 32D are exposed at the surface of the multilayer body 10, while the former is spaced apart from the latter.

With such a configuration, it is possible to achieve the shape of the external electrode 40 according to a preferred embodiment including an opening portion H described later. Furthermore, it is possible to shorten the distance between the second extension portion 31C of the first internal electrode layer 31 and the fifth extension portion 32C of the second internal electrode layer 32, and it is possible to shorten the distance between the third extension portion 31D of the first internal electrode layer 31 and the sixth extension portion 32D of the second internal electrode layer 32. This configuration makes it possible to shorten the path through which the current flows. With such a configuration, it is possible to reduce the ESL.

In a preferred embodiment of the present invention, the first counter electrode portion 31A and the second counter electrode portion 32A are opposed to each other with the dielectric layer 20 interposed therebetween, such that a capacitance is generated, providing the characteristics of a capacitor.

The shapes of the first counter electrode portion 31A and the second counter electrode portion 32A are not particularly limited. However, they are preferably rectangular or substantially rectangular, for example. However, the corners of the rectangular or substantially rectangular shape may be rounded or slanted.

The shapes of the first extension portion 31B and the fourth extension portion 32B are not particularly limited. However, they are preferably rectangular or substantially rectangular. However, the corners of the rectangular or substantially rectangular shape may be rounded or slanted. In a preferred embodiment of the present invention, the shapes of the first extension portion 31B and the fourth extension portion 32B are T-shaped or substantially T-shaped with the corners of the rectangular shape partially removed.

The shapes of the second extension portion 31C, the third extension portion 31D, the fifth extension portion 32C, and the sixth extension portion 32D are not particularly limited. However, they are preferably rectangular or substantially rectangular. However, the corners of the rectangular or substantially rectangular shape may be rounded or slanted.

The dimension in the width direction W of the first extension portion 31B exposed at the first end surface LS1 is larger than the dimension in the width direction of the first counter electrode portion 31A. The dimension in the width direction W of the fourth extension portion 32B exposed at the second end surface LS2 is greater than the dimension in the width direction of the second counter electrode portion 32A.

Each of the first extension portion 31B and the fourth extension portion 32B includes a portion exposed at a portion of the first lateral surface WS1. The dimension in the length direction L of the portion exposed at a portion of the first lateral surface WS1 is preferably, for example, about 30 μm or more and about 230 μm or less. Each of the first extension portion 31B and the fourth extension portion 32B includes a portion exposed at a portion of the second lateral surface WS2. The dimension in the length direction L of the portion exposed at a portion of the second lateral surface WS2 is preferably, for example, about 30 μm or more and about 230 μm or less. Each of the second extension portion 31C and the fifth extension portion 32C includes a portion exposed at a portion of the first lateral surface WS1. The dimension in the length direction L of the portion exposed at a portion of the first lateral surface WS1 is preferably, for example, about 30 μm or more and about 230 μm or less. Each of the third extension portion 31D and the sixth extension portion 32D includes a portion exposed at a portion of the second lateral surface WS2. The dimension in the length direction L of the portion exposed at a portion of the second lateral surface WS2 is preferably, for example, about 30 μm or more and about 230 μm or less.

The dimensions of the extension portions exposed at these lateral surfaces of the multilayer body 10 may be equal or substantially equal to each other. However, the dimension in the length direction L of the portion exposed at a portion of the first lateral surface WS1, of each of the second extension portion 31C and the fifth extension portion 32C, may be longer than the dimension in the length direction L of the portion exposed at a portion of the first lateral surface WS1, of each of the first extension portion 31B and the fourth extension portion 32B. The dimension in the length direction L of the portion exposed at a portion of the second lateral surface WS2, of each of the third extension portion 31D and the sixth extension portion 32D, may be longer than the dimension in the length direction L of the portion exposed at a portion of the second lateral surface WS2, of each of the first extension portion 31B and the fourth extension portion 32B.

The first internal electrode layer 31 and the second internal electrode layer 32 are each made of an appropriate conductive material including, for example, a metal such as Ni, Cu, Ag, Pd, and Au, and an alloy including at least one selected from these metals. When an alloy is used, the first internal electrode layer 31 and the second internal electrode layer 32 may be made of, for example, a Ag—Pd alloy.

The thickness of each of the first internal electrode layers 31 and the second internal electrode layers 32 is preferably, for example, about 0.2 μm or more and about 2.0 μm or less. The total number of the first internal electrode layers 31 and the second internal electrode layers 32 is preferably, for example, 15 or more and 200 or less.

The first main surface-side outer layer portion 12 is located on the first main surface TS1 side of the multilayer body 10. The first main surface-side outer layer portion 12 is an assembly of a plurality of dielectric layers 20 located between the first main surface TS1 and the internal electrode layer 30 closest to the first main surface TS1. In other words, the first main surface-side outer layer portion 12 includes a plurality of dielectric layers 20 located between the first main surface TS1 and the internal electrode layer 30 located closest to the first main surface TS1 side among the plurality of internal electrode layers 30. The dielectric layers 20 used in the first main surface-side outer layer portion 12 may be the same or substantially the same as the dielectric layers 20 used in the inner layer portion 11.

The second main surface-side outer layer portion 13 is located on the second main surface TS2 side of the multilayer body 10. The second main surface-side outer layer portion 13 is an assembly of a plurality of dielectric layers 20 located between the second main surface TS2 and the internal electrode layer 30 closest to the second main surface TS2. In other words, the second main surface-side outer layer portion 13 includes a plurality of dielectric layers 20 located between the second main surface TS2 and the internal electrode layer 30 located closest to the second main surface TS2 side among the plurality of internal electrode layers 30. The dielectric layers 20 used in the second main surface-side outer layer portion 13 may be the same or substantially the same as the dielectric layers 20 used in the inner layer portion 11.

As described above, the multilayer body 10 includes a laminated plurality of dielectric layers 20 and a plurality of internal electrode layers 30 laminated on dielectric layer 20. That is, the multilayer ceramic capacitor 1 includes the multilayer body 10 including the dielectric layers 20 and the internal electrode layers 30 alternately laminated therein.

The multilayer body 10 includes a counter electrode portion 11E. The counter electrode portion 11E refers to a portion where the first counter electrode portion 31A of the first internal electrode layer 31 and the second counter electrode portion 32A of the second internal electrode layer 32 are opposed to each other. The counter electrode portion 11E is defined as and functions as a portion of the inner layer portion 11. FIGS. 8A and 8B each show the ranges of the width direction W and the length direction L of the counter electrode portion 11E. The counter electrode portion 11E is also referred to as a capacitor active portion.

The multilayer body 10 includes an end surface-side outer layer portion. The end surface-side outer layer portion includes a first end surface-side outer layer portion LG1 located on the first end surface LS1 side and a second end surface-side outer layer portion LG2 located on the second end surface LS2 side. The first end surface-side outer layer portion LG1 includes the dielectric layers 20 and the first extension portion 31B located between the counter electrode portion 11E and the first end surface LS1. That is, the first end surface-side outer layer portion LG1 is an assemble of portions on the first end surface LS1 side of the plurality of dielectric layer 20, and the plurality of first extension portion 31B. The second end surface-side outer layer portion LG2 includes the dielectric layers 20 and the fourth extension portions 32B located between the counter electrode portion 11E and the second end surface LS2. That is, the second end surface-side outer layer portion LG2 is an assembly of portions on the second end surface LS2 side of the plurality of dielectric layer 20, and the plurality of fourth extension portion 32B. FIGS. 6, 8A, and 8B each show the ranges in the length direction L of the first end surface-side outer layer portion LG1 and the second end surface-side outer layer portion LG2. The first end surface-side outer layer portion LG1 and the second end surface-side outer layer portion LG2 are also referred to as L gaps or end gaps.

The multilayer body 10 includes a lateral surface-side outer layer portion. The lateral surface-side outer layer portion includes a first lateral surface-side outer layer portion WG1 located on the first lateral surface WS1 side and a second lateral surface-side outer layer portion WG2 located on the second lateral surface WS2 side. The first lateral surface-side outer layer portion WG1 includes the dielectric layers 20 located between the counter electrode portion 11E and the first lateral surface WS1. That is, the first lateral surface-side outer layer portion WG1 is an assembly of portions on the first lateral surface WS1 side of the plurality of dielectric layers 20. The second lateral surface-side outer layer portion WG2 includes the dielectric layers 20 located between the counter electrode portion 11E and the second lateral surface WS2. That is, the second lateral surface-side outer layer portion WG2 is an assembly of portions on the second lateral surface WS2 side of the dielectric layers 20. FIGS. 7, 8A, and 8B each show the ranges in the width direction W of the first lateral surface-side outer layer portion WG1 and the second lateral surface-side outer layer portion WG2. The first lateral surface-side outer layer portion WG1 and the second lateral surface-side outer layer portion WG2 are also referred to as W gaps or side gaps.

As shown in FIGS. 6 to 8B, in the multilayer body 10, when the dimension in the length direction L from the first end surface LS1 to the second end surface LS2 is defined as l, the dimension in the width direction W from the first lateral surface WS1 to the second lateral surface WS2 is defined as w, and the dimension in the height direction T from the first main surface TS1 to the second main surface TS2 is defined as t, their dimensional relationship is satisfied as $w>l>t$, for example. With such a configuration, it is possible to widen the widths of the extension portions at the end surfaces of the internal electrode layers 30. In addition, since it is possible to shorten the distance between the first external electrode 40A and the second external electrode 40B, it is possible to reduce the ESL of the multilayer ceramic capacitor 1.

The dimension l in the length direction L from the first end surface LS1 to the second end surface LS2 of the multilayer body 10 is preferably, for example, about 0.05 mm or more and about 0.7 mm or less. The dimension w in the width direction W from the first lateral surface WS1 to the second lateral surface WS2 of the multilayer body 10 is preferably, for example, about 0.15 mm or more and about 1.5 mm or less. Furthermore, it is preferable that the dimension t in the height direction T from the first main surface TS1 to the second main surface TS2 of the multilayer body 10 is, for example, about 150 µm or less. Such a configuration enables high-density mounting. Furthermore, the dimension t in the height direction T from the first main surface TS1 to the second main surface TS2 of the multilayer body 10 is preferably, for example, about 100 µm or less, and more preferably, for example about 50 µm or less. Such a configuration enables higher density mounting.

The respective dimensions of l, w, and t of the multilayer body 10 are measured by the following methods.

First, the dimension w of the multilayer body 10 is measured. More specifically, the dimension w of the multilayer body 10 is measured by a micrometer at the middle position in the length direction L of the multilayer ceramic capacitor 1, i.e., at the L/2 position of the multilayer ceramic capacitor 1.

Next, the dimensions l and t of the multilayer body 10 are measured. First, the same multilayer ceramic capacitor 1 as the multilayer ceramic capacitor 1 for which the dimension w was measured is polished so as to be parallel to the LT plane up to the middle position in the width direction W of the multilayer ceramic capacitor 1, i.e., up to the W/2 position of the multilayer ceramic capacitor 1. Then, the LT cross section exposed by the polishing is observed by microscope. The dimension l of the multilayer body 10 is measured by microscope at the middle position in the LT cross section in the height direction T of the multilayer body 10, i.e., at the t/2 position of the multilayer body 10. The dimension t of the multilayer body 10 is measured by microscope at the middle position in the LT cross section in the length direction L of the multilayer body 10, i.e., at the l/2 position of the multilayer body 10.

The external electrode 40 includes a first external electrode 40A provided on the first end surface LS1 side and a second external electrode 40B provided on the second end surface LS2 side.

The first external electrode 40A is connected to the first internal electrode layers 31. The first external electrode 40A of a preferred embodiment of the present invention includes a first surface portion 40A1 located on the first end surface LS1, a second surface portion 40A2 located on a portion of the first main surface TS1, a third surface portion 40A3 located on a portion of the second main surface TS2, a fourth surface portion 40A4 located on a portion of the first lateral surface WS1, and a fifth surface portion 40A5 located on a portion of the second lateral surface WS2. The first external electrode 40A preferably includes at least one the second surface portion 40A2 located on a portion of the first main surface TS1 and the third surface portion 40A3 located on a portion of the second main surface TS2, the first surface portion 40A1 located on a portion of the first end surface LS1, the fourth surface portion 40A4 located on a portion of the first lateral surface WS1, and the fifth surface portion 40A5 located on a portion of the second lateral surface WS2.

The first surface portion 40A1 covers the entire or substantially the entire first end surface LS1 and is connected to the first internal electrode layers 31. Either the second surface portion 40A2 or the third surface portion 40A3 is connected to a land of the mounting board.

The fourth surface portion 40A4 is connected to the first extension portion 31B and the second extension portion 31C that are exposed at the first lateral surface WS1. The fifth surface portion 40A5 is connected to the first extension portion 31B and the third extension portion 31D that are exposed at the second lateral surface WS2. Thus, all of the first extension portion 31B, the second extension portion 31C, and the third extension portion 31D are connected to the same external electrode, which is the first external electrode 40A.

The fourth surface portion 40A4 and the fifth surface portion 40A5 each include an opening portion H at which the multilayer body 10 is exposed. The opening portion H is surrounded by a material of the external electrode 40. The opening portion H is a recess that is recessed from each surface of the fourth surface portion 40A4 and the fifth surface portion 40A5, and the surface of multilayer body 10 is exposed at the bottom of the recess.

The formation of such an opening portion H provides connection surfaces on each of the fourth surface portion 40A4 and the fifth surface portion 40A5. The connection surfaces are provided on both sides of the opening portion H in the length direction L of the multilayer body 10 on each of the fourth surface portion 40A4 and the fifth surface portion 40A5. The connection surfaces connect the second surface portion 40A2 and the third surface portion 40A3 in the height direction. The connection surfaces are each defined as and function as a solder wetting portion.

As shown in FIG. 2, the fourth surface portion 40A4 includes a first connection surface F1 that connects the second surface portion 40A2 and the third surface portion 40A3 in the height direction. The first connection surface F1 is located on a side of the opening portion H which is closer to the center of the multilayer body 10 in the length direction L than the first end surface LS1. The fourth surface portion 40A4 also includes a second connection surface F2 that connects the second surface portion 40A2 and the third surface portion 40A3 in the height direction. The second connection surface F2 is located on a side of the opening portion H which is closer to the first end surface LS1 side than the center of the multilayer body 10. The second connection surface F2 is connected to the first surface portion 40A1.

As shown in FIG. 3, the fifth surface portion 40A5 includes a third connection surface F3 that connects the second surface portion 40A2 and the third surface portion 40A3 in the height direction. The third connection surface F3 is located on a side of the opening portion H which is closer to the center of the multilayer body 10 in the length direction L than the first end surface LS1. The fifth surface portion 40A5 also includes a fourth connection surface F4 that connects the second surface portion 40A2 and the third surface portion 40A3 in the height direction. The fourth connection surface F4 is located on a side of the opening portion H which is closer to the first end surface LS1 side than the center of the multilayer body 10. The fourth connection surface F4 is connected to the first surface portion 40A1.

The second external electrode 40B is connected to the second internal electrode layers 32. The second external electrode 40B of a preferred embodiment of the present invention includes a sixth surface portion 40B1 located on the second end surface LS2, a seventh surface portion 40B2 located on a portion of the first main surface TS1, an eighth surface portion 40B3 located on a portion of the second main surface TS2, a ninth surface portion 40B4 located on a portion of the first lateral surface WS1, and a tenth surface portion 40B5 located on a portion of the second lateral surface WS2. The second external electrode 40B preferably includes at least one of the seventh surface portion 40B2 located on a portion of the first main surface TS1 and the eighth surface portion 40B3 located on a portion of the second main surface TS2, the sixth surface portion 40B1 located on a portion of the second end surface LS2, the ninth surface portion 40B4 located on a portion of the first lateral surface WS1, and the tenth surface portion 40B5 located on a portion of the second lateral surface WS2.

The sixth surface portion 40B1 covers the entire or substantially the entire second end surface LS2 and is connected to the second internal electrode layers 32. Either the seventh surface portion 40B2 or the eighth surface portion 40B3 is connected to a land of the mounting board.

The ninth surface portion 40B4 is connected to the fourth extension portion 32B and the fifth extension portion 32C that are exposed at the first lateral surface WS1. The tenth surface portion 40B5 is connected to the fourth extension portion 32B and the sixth extension portion 32D that are exposed at the second lateral surface WS2. Thus, all of the fourth extension portion 32B, the fifth extension portion 32C, and the sixth extension portion 32D are connected to the same external electrode, which is the second external electrode 40B.

The ninth surface portion 40B4 and the tenth surface portion 40B5 each include an opening portion H at which the multilayer body 10 is exposed. The opening portion H is surrounded by the material of the external electrode 40. The opening portion H is a recess that is recessed from each surface of the ninth surface portion 40B4 and the tenth surface portion 40B5, and the surface of multilayer body 10 is exposed at the bottom of the recess.

The formation of such an opening portion H provides connection surfaces on each of the ninth surface portion 40B4 and the tenth surface portion 40B5. The connection surfaces are provided on both sides of the opening portion H in the length direction L of the multilayer body 10 on each of the ninth surface portion 40B4 and the tenth surface portion 40B5. The connection surfaces connect the seventh surface portion 40B2 and the eighth surface portion 40B3 in the height direction. The connection surfaces are each defined as and function as a solder wetting portion.

As shown in FIG. 2, the ninth surface portion 40B4 includes a fifth connection surface F5 that connects the seventh surface portion 40B2 and the eighth surface portion 40B3 in the height direction. The fifth connection surface F5 is located on a side of the opening portion H which is closer to the center of the multilayer body 10 in the length direction L than the second end surface LS2. The ninth surface portion 40B4 also includes a sixth connection surface F6 that connects the seventh surface portion 40B2 and the eighth surface portion 40B3 in the height direction. The sixth connection surface F6 is located on a side of the opening portion H which is closer to the second end surface LS2 side than the center of the multilayer body 10. The sixth connection surface F6 is connected to the sixth surface portion 40B1.

As shown in FIG. 3, the tenth surface portion 40B5 includes a seventh connection surface F7 that connects the seventh surface portion 40B2 and the eighth surface portion 40B3 in the height direction. The seventh connection surface F7 is located on a side of the opening portion H which is closer to the center of the multilayer body 10 in the length direction L than the second end surface LS2. The tenth surface portion 40B5 also includes an eighth connection surface F8 that connects the seventh surface portion 40B2 and the eighth surface portion 40B3 in the height direction. The eighth connection surface F8 is located on a side of the opening portion H which is closer to the second end surface LS2 side than the center of the multilayer body 10. The eighth connection surface F8 is connected to the sixth surface portion 40B1.

With such a configuration, it is possible to appropriately set the amount of solder wetting with respect to the first lateral surface WS1 and the second lateral surface WS2 of the multilayer body 10. Furthermore, the solder is spread so as to surround the opening portion H. Therefore, it is possible to allow the solder to be spread separately into two locations with the opening portion H as a border. With such a configuration, it is possible to disperse the locations stressed by the solder into two locations on the mounting surface side of the multilayer ceramic capacitor 1. Therefore, the self-alignment effect is improved, and the mountability of the multilayer ceramic capacitor 1 is stabilized. As a result, it is possible to reduce tilting of the multilayer ceramic capacitor 1 or to prevent the multilayer ceramic capacitor 1 from tilting. Furthermore, it is possible to reduce the rotation of the multilayer ceramic capacitor 1 that causes a short-circuit failure, or to prevent the multilayer ceramic capacitor 1 from rotating to cause a short-circuit failure.

Furthermore, the respective opening portions H in the fourth surface portion 40A4, the fifth surface portion 40A5, the ninth surface portion 40B4, and the tenth surface portion 40B5 preferably have the same or substantially the same size. The shape of each of the opening portions H is not particularly limited, and is preferably a rectangular or substantially rectangular shape, a polygonal or substantially polygonal shape, a circular or substantially circular shape, or an elliptical or substantially elliptical shape, for example.

The opening portion H provided in each of the fourth surface portion 40A4 and the fifth surface portion 40A5 is preferably located in the middle or approximate middle in the height direction T of each of the fourth surface portion 40A4 and the fifth surface portion 40A5. The opening portion H provided in each of the fourth surface portion 40A4 and the fifth surface portion 40A5 is preferably located in the middle or approximate middle in the length direction L of each of the fourth surface portion 40A4 and the fifth surface portion 40A5. Alternatively, the opening portion H provided in each of the fourth surface portion 40A4 and the fifth surface portion 40A5 is preferably located more toward the first end surface LS1 than in the middle in the length direction L of each of the fourth surface portion 40A4 and the fifth surface portion 40A5. By providing the opening portion H provided in each of the fourth surface portion 40A4 and the fifth surface portion 40A5 so as to be located toward the first end surface LS1, it is possible to secure the areas of the first connection surface F1 and the third connection surface F3 as the solder wetting portions.

The opening portion H provided in each of the ninth surface portion 40B4 and the tenth surface portion 40B5 is preferably located in the middle or approximate middle in the height direction T of the ninth surface portion 40B4 and the tenth surface portion 40B5. The opening portion H provided in each of the ninth surface portion 40B4 and the tenth surface portion 40B5 is preferably located in the middle or approximate middle in the length direction L of each of the ninth surface portion 40B4 and the tenth surface portion 40B5. Alternatively, the opening portion H provided in each of the ninth surface portion 40B4 and the tenth surface portion 40B5 is preferably located more toward the second end surface LS2 than in the middle in the length direction L of each the ninth surface portion 40B4 and the tenth surface portion 40B5. By providing the opening portion H provided in each of the ninth surface portion 40B4 and the tenth surface portion 40B5 so as to be located toward the second end surface LS2, it is possible to secure the areas of the fifth connection surface F5 and the seventh connection surface F7 as the solder wetting portions.

With such a configuration, the solder is divided in two with the opening portion H as a border such that the solder is easily dispersed. With such a configuration, it is possible to disperse the location stressed by the solder into two locations on the mounting surface side of the multilayer ceramic capacitor 1. Therefore, the self-alignment effect is improved, and the mountability of the multilayer ceramic capacitor 1 is stabilized. As a result, it is possible to reduce tilting of the multilayer ceramic capacitor 1 or to prevent the multilayer ceramic capacitor 1 from tilting. Furthermore, it is possible to reduce the rotation of the multilayer ceramic capacitor 1 that causes a short-circuit failure, or to prevent the multilayer ceramic capacitor 1 from rotating to cause a short-circuit failure.

The areas of the opening portions H provided in the fourth surface portion 40A4, the fifth surface portion 40A5, the ninth surface portion 40B4, and the tenth surface portion 40B5 are preferably, for example about 1% or more and about 50% or less respectively with respect to the areas of the fourth surface portion 40A4, the fifth surface portion 40A5, the ninth surface portion 40B4, and the tenth surface portion 40B5. More preferably, for example, the area ratios of the opening portions H are each about 3% or more and about 20% or less. With such a configuration, it is possible to improve the self-alignment effect, and thus it is possible to further improve the advantageous effects of reducing tilting of the multilayer ceramic capacitor 1 or preventing the multilayer ceramic capacitor 1 from tilting, and reducing the rotation of the multilayer ceramic capacitor 1 that causes a short-circuit failure, or preventing the multilayer ceramic capacitor 1 from rotating to cause a short-circuit failure.

The area ratios of the opening portions H described above are each measured using an optical microscope, for example. Hereinafter, referring to FIG. 2, an example of a method of measuring the area ratio of the opening portion H in the fourth surface portion 40A4 will be described. Hereinafter, a measuring method in a case in which both the region of the fourth surface portion 40A4 and the opening portion H are rectangular or substantially rectangular will be described.

First, the field of view is set so that the first external electrode 40A located at the first lateral surface WS1 of the multilayer ceramic capacitor 1 is adjusted in magnification to fall within the field of view of the microscope. Next, the contour of the opening portion H is identified, and the dimension d1 in the length direction L and the dimension d2 in the height direction T of the opening portion H are measured. Thereafter, the area A1 of the opening portion H is calculated by the equation A1=d1×d2. Next, the contour of the first external electrode 40A is identified, and the dimension D1 in the length direction L and the dimension D2 in the height direction T of the fourth surface portion 40A4 are measured. Thereafter, the area A2 of the fourth surface portion 40A4 is calculated by the equation A2=D1× D2. Thereafter, the area ratio of the opening portion H located in the fourth surface portion 40A4 to the area of the fourth surface portion 40A4 is calculated by the equation A1/A2.

Although the method of measuring the area ratio of the opening portion H located in the fourth surface portion 40A4 is described as an example of the method of measuring the area ratio of the opening portion H, the area ratios of the opening portions H located in the fifth surface portion 40A5, the ninth surface portion 40B4, and the tenth surface portion 40B5 are also calculated by the same or substantially the same measuring method. The area ratios of the opening portions H located in the fourth surface portion 40A4, the fifth surface portion 40A5, the ninth surface portion 40B4, and the tenth surface portion 40B5 are calculated, respectively, and thereafter, the average of the area ratios of the four opening portions H is calculated as the area ratio of the opening portion H in the multilayer ceramic capacitor 1.

As shown in FIG. 10A, the first external electrode 40A includes a first base electrode layer 50A and a first plated layer 60A provided on the first base electrode layer 50A. The first base electrode layer 50A is provided on the surface of the multilayer body 10. The first plated layer 60A covers the first base electrode layer 50A.

As shown in FIG. 10B, the second external electrode 40B includes a second base electrode layer 50B and a second plated layer 60B disposed on second base electrode layer 50B. The second base electrode layer 50B is provided on the surface of the multilayer body 10. The second plated layer 60B covers the second base electrode layer 50B.

The first base electrode layer 50A and the second base electrode layer 50B include at least one of a fired layer and a thin film layer, for example.

The first base electrode layer 50A and the second base electrode layer 50B are thin film layers in a preferred embodiment of the present invention. The thin film layer is a layer on which metal particles are deposited.

In a case in which the first base electrode layer 50A and the second base electrode layer 50B are thin film layers, they are preferably formed by, for example, a thin film forming method such as a sputtering method or a deposition method. Here, an electrode formed by using a sputtering method (sputtering electrode) will be described.

The first base electrode layer 50A according to a preferred embodiment of the present invention includes a first thin film layer 51A formed by a sputtering electrode. Second base electrode layer 50B includes a second thin film layer 51B formed by a sputtering electrode. When the base electrode layer includes a sputtering electrode, it is preferable to form the sputtering electrode directly on the first main surface TS1 and the second main surface TS2 of the multilayer body 10.

As shown in FIGS. 6 and 10A, the first thin film layer 51A formed by the sputtering electrode is provided on a portion of the first main surface TS1 on the first end surface LS1 side and on a portion of the second main surface TS2 on the first end surface LS1 side. More specifically, it is preferable that the first thin film layer 51A is provided at a portion covered by the first external electrode 40A shown in FIG. 4 on the first main surface TS1. It is preferable that the first thin film layer 51A is provided at a portion covered by the first external electrode 40A shown in FIG. 5 on the second main surface TS2.

Furthermore, as shown in FIG. 9, it is preferable that the first thin film layer 51A is provided on a portion of the first main surface TS1 and a portion of the first lateral surface WS1 in a manner surrounding or somewhat surrounding the portion of the first lateral surface WS1 which are provided continuously from the portion of the first main surface TS1. It is preferable that the first thin film layer 51A is provided on a portion of the second main surface TS2 and a portion of the first lateral surface WS1 in a manner surrounding or somewhat surrounding the portion of the first lateral surface WS1 which is provided continuously from the portion of the second main surface TS2.

Although not shown, it is preferable that, similarly to the first lateral surface WS1 side, also on the second lateral surface WS2 side, the first thin film layer 51A is provided on a portion of the first main surface TS1 and a portion of the second lateral surface WS2 in a manner surrounding or somewhat surrounding the portion of the second lateral surface WS2 which is provided continuously from the portion of the first main surface TS1. Furthermore, it is preferable that the first thin film layer 51A is provided on a portion of the second main surface TS2 and a portion of the second lateral surface WS2 in a manner surrounding or somewhat surrounding the portion of the second lateral surface WS2 which is provided continuously from the portion of the second main surface TS2.

For example, in a case in which a chamfered portion such as, for example, a rounded portion is provided at the ridge of the multilayer body 10, it is preferable that the first thin film layer 51A is provided on a portion of the first main surface TS1 on the first end surface LS1 side, and a chamfered portion on the first lateral surface WS1 side and a chamfered portion on the second lateral surface WS2 side which are provided continuously from the portion of the first main surface TS1 on the first end surface LS1 side. It is preferable that the first thin film layer 51A is provided on a portion of the second main surface TS2 on the first end surface LS1 side, and a chamfered portion on the first lateral surface WS1 side and a chamfered portion on the second lateral surface WS2 side which are provided continuously from the portion of the second main surface TS2 on the first end surface LS1 side. With such a configuration, it is possible to easily form thin film layers by, for example, a sputtering method or other methods.

According to the above-described method, when forming a plated layer, it is possible to control the distances between the first thin film layer 51A provided on a portion of the first lateral surface WS1 and a portion of the second lateral surface WS2, and the internal electrode layers 30 exposed on the first lateral surface WS1 and the second lateral surface WS2. Thus, it becomes easy to deposit a plated layer also on the surface of the multilayer body 10 between the first thin film layer 51A provided on a portion of the first lateral surface WS1 and a portion of the second lateral surface WS2, and the internal electrode layers 30 exposed on the first lateral surface WS1 and the second lateral surface WS2.

As shown in FIGS. 6 and 10B, the second thin film layer 51B formed by, for example, the sputtering electrode is provided on a portion of the first main surface TS1 on the second end surface LS2 side and on a portion of the second main surface TS2 on the second end surface LS2 side. More specifically, it is preferable that the second thin film layer 51B is provided on a portion of the first main surface TS1 which is covered by the second external electrode 40B shown in FIG. 4. It is preferable that the second thin film layer 51B is provided on a portion of the second main surface TS2 which is covered by the second external electrode 40B shown in FIG. 5.

Furthermore, as shown in FIG. 9, it is preferable that the second thin film layer 51B is provided on a portion of the first main surface TS1 and a portion of the first lateral surface WS1 in a manner surrounding or somewhat surrounding the portion of the first lateral surface WS1 which is provided continuously from the portion of the first main surface TS1. It is preferable that the second thin film layer 51B is provided on a portion of the second main surface TS2 and a portion of the first lateral surface WS1 in a manner surrounding or somewhat surrounding the portion of the first lateral surface WS1 which is provided continuously from the portion of the second main surface TS2.

Although not shown, it is preferable that, similarly to the first lateral surface WS1 side, also on the second lateral surface WS2 side, the second thin film layer 51B is provided on a portion of the first main surface TS1 and a portion of the second lateral surface WS2 in a manner surrounding or somewhat surrounding the portion of the second lateral surface WS2 which is provided continuously from the portion of the first main surface TS1. Furthermore, it is preferable that the second thin film layer 51B is provided on a portion of the second main surface TS2 and a portion of the second lateral surface WS2 in a manner surrounding or somewhat surrounding the portion of the second lateral surface WS2 which is provided continuously from the portion of the second main surface TS2.

For example, in a case in which a chamfered portion such as, for example, a rounded portion is provided at the ridge of the multilayer body 10, it is preferable that the second thin film layer 51B is provided on a portion of the first main surface TS1 on the second end surface LS2 side, and on a chamfered portion on the first lateral surface WS1 side and a chamfered portion on the second lateral surface WS2 side which are provided continuously from the portion of the first main surface TS1 on the second end surface LS2 side. It is preferable that the second thin film layer 51B is provided on a portion of the second main surface TS2 on the second end surface LS2 side, and on a chamfered portion on the first lateral surface WS1 side and a chamfered portion on the second lateral surface WS2 side which are provided continuously from the portion of the second main surface TS2 on the second end surface LS2 side. With such a configuration, it is possible to easily form thin film layers by a sputtering method or other methods.

According to the above-described method, when forming a plated layer, it is possible to control the distances between the second thin film layer 51B provided on a portion of the first lateral surface WS1 and a portion of the second lateral surface WS2, and the internal electrode layers 30 exposed on the first lateral surface WS1 and the second lateral surface WS2. Thus, it becomes easy to also deposit a plated layer on the surface of the multilayer body 10 between the second thin film layer 51B provided on a portion of the first lateral surface WS1 and a portion of the second lateral surface WS2, and the internal electrode layers 30 exposed on the first lateral surface WS1 and the second lateral surface WS2.

The thin film layer formed by the sputtering electrode preferably includes at least one metal selected from the group including, for example, Mg, Al, Ti, W, Cr, Cu, Ni, Ag, Co, Mo and V. Thus, it is possible to increase the adhesion of the external electrode 40 to the multilayer body 10. The thin film layer may be a single layer or may include a plurality of layers. For example, the thin film layer may include a two-layer structure including a layer of Ni—Cr alloy and a layer of Ni—Cu alloy.

The thickness of the sputtering electrode in the lamination direction between the first main surface TS1 and the second main surface TS2 is preferably, for example, about 50 nm or more and about 400 nm or less, and more preferably, for example, about 50 nm or more and about 130 nm or less.

When providing the base electrode layer by directly forming an electrode using the sputtering method on the first main surface TS1 and the second main surface TS2 of the multilayer body 10, it is preferable to provide a base electrode layer as a fired layer on the first end surface LS1 and the second end surface LS2, or alternatively it is preferable to directly provide a plated layer to be described later without providing the base electrode layer. In a preferred embodiment of the present invention, a plated layer to be described later is directly provided on the first end surface LS1 and the second end surface LS2 without providing a base electrode layer.

As will be described later in a modified example of a preferred embodiment of the present invention, the first base electrode layer 50A and the second base electrode layer 50B may be fired layers. It is preferable that the fired layer includes, for example, a metal component, and either a glass component or a ceramic component, or a metal component and both a glass component and a ceramic component. The metal component includes at least one selected from Cu, Ni, Ag, Pd, Ag—Pd alloys, and Au, for example. The glass component includes at least one selected from B, Si, Ba, Mg, Al, and Li, for example. For the ceramic component, a ceramic material of the same kind as that of the dielectric layer 20 may be used, or a ceramic material of a different kind may be used. The ceramic component includes, for example, at least one selected from $BaTiO_3$, $CaTiO_3$, (Ba, Ca)$TiO_3$, $SrTiO_3$, and $CaZrO_3$, for example.

The fired layer is obtained, for example, by applying a conductive paste containing glass and metal to the multilayer body 10 and firing the paste. The fired layer may be obtained, for example, by co-firing a laminate chip including internal electrode layers and dielectric layers, and a conductive paste applied to the laminate chip, or may be obtained, for example, by firing the laminate chip including the internal electrode layers and the dielectric layers to obtain the multilayer body 10, and thereafter applying the conductive paste to the multilayer body 10 for firing. In a case of co-firing the laminate chip including the internal electrode layers and the dielectric layers, and the conductive paste applied to the laminate chip, it is preferable that the fired layer is formed by firing a material to which a ceramic material instead of glass component is added. In this case, it is particularly preferable to use, as the ceramic material to be added, the same type of ceramic material as the dielectric layer 20. Furthermore, the fired layer may include a plurality of layers.

Alternatively, the first plated layer 60A and the second plated layer 60B described later may be directly provided on the multilayer body 10 without the first base electrode layer 50A and the second base electrode layer 50B provided.

The first plated layer 60A covers the first base electrode layer 50A.

The second plated layer 60B covers the second base electrode layer 50B.

The first plated layer 60A and the second plated layer 60B may include at least one selected from Cu, Ni, Sn, Ag, Pd, Ag—Pd alloys, and Au, for example. Each of the first plated layer 60A and the second plated layer 60B may include a plurality of layers.

In a case in which the base electrode layer is a thin film layer, it is preferable that the plated layer includes a three-layer structure including a Cu plated layer defining and functioning as a lower plated layer, a Ni plated layer defining and functioning as an intermediate plated layer, and a Sn plated layer defining and functioning as an upper plated layer. That is, the first plated layer 60A includes a first Cu plated layer 61A, a first Ni plated layer 62A, and a first Sn plated layer 63A. The second plated layer 60B includes a second Cu plated layer 61B, a second Ni plated layer 62B, and a second Sn plated layer 63B. However, the first plated layer 60A and the second plated layer 60B are not limited to a three-layer structure, and may have other layer configurations.

The first Cu plated layer 61A covers the first end surface LS1 of the multilayer body 10, and the first thin film layer 51A defining and functioning as the first base electrode layer 50A provided on the first main surface TS1 and the second main surface TS2 of the multilayer body 10. In a preferred embodiment of the present invention, the first Cu plated layer 61A covers portions of the first lateral surface WS1 and the second lateral surface WS2 of the multilayer body 10 at which the internal electrode layers 30 are exposed. At this time, the gap between the first thin film layer 51A and the internal electrode layer 30 exposed on the surface of the multilayer body 10, and the gaps between the plurality of internal electrode layers 30 exposed on the surface of multilayer body 10 are narrow. Therefore, a plated layer is also deposited on the regions of these gaps. With such a configuration, the opening portion H is provided on the fourth surface portion 40A4 and the fifth surface portion 40A5 of the first external electrode 40A.

The first Ni plated layer 62A covers the first Cu plated layer 61A. The first Sn plated layer 63A covers the first Ni plated layer 62A. In a preferred embodiment of the present invention, the first plated layer 60A is electrically connected directly to the first internal electrode layer 31.

The second Cu plated layer 61B covers the second end surface LS2 of the multilayer body 10, and the second thin film layer 51B functioning as the second base electrode layer 50B provided on the first main surface TS1 and the second main surface TS2 of the multilayer body 10. In a preferred embodiment of the present invention, the second Cu plated layer 61B covers portions of the first lateral surface WS1 and the second lateral surface WS2 of the multilayer body 10 at which the internal electrode layers 30 are exposed. At this time, the gap between the second thin film layer 51B and the internal electrode layer 30 exposed on the surface of multilayer body 10, and the gaps between the plurality of internal electrode layers 30 exposed on the surface of multilayer body 10 are narrow. Therefore, a plated layer is also deposited on the regions of these gaps. With such a configuration, the above-described opening portion H is provided on the ninth surface portion 40B4 and the tenth surface portion 40B5 of the second external electrode 40B.

The second Ni plated layer 62B covers the second Cu plated layer 61B. The second Sn plated layer 63B covers the second Ni plated layer 62B layer. In a preferred embodiment of the present invention, the second plated layer 60B is electrically connected directly to the second internal electrode layer 32.

By providing a plated layer including a Cu plated layer and a Ni plated layer so as to cover the base electrode layer, the base electrode layer is prevented from being eroded by solder at the time of mounting the multilayer ceramic capacitor 1. Furthermore, by providing the Sn plated layer on the surface of the Ni plated layer, the wettability of the solder when mounting the multilayer ceramic capacitor 1 is improved. With such a configuration, it is possible to easily mount the multilayer ceramic capacitor 1.

The thickness per plated layer is preferably, for example, about 2 μm or more and about 15 μm or less. That is, the average thickness of each of the first Cu plated layer 61A, the first Ni plated layer 62A, the first Sn plated layer 63A, the second Cu plated layer 61B, the second Ni plated layer 62B, and the second Sn plated layer 63B is preferably, for example, about 2 μm or more and about 15 μm or less. More specifically, the average thickness of each of the first Cu plated layer 61A and the second Cu plated layer 61B is more preferably, for example, about 5 μm or more and about 8 μm or less. Furthermore, the average thickness of each of the first Ni plated layer 62A, the first Sn plated layer 63A, the second Ni plated layer 62B, and the second Sn plated layer 63B is more preferably, for example, about 2 μm or more and about 4 μm or less.

When the dimension in the length direction between the first end surface LS1 and the second end surface LS2 of the multilayer ceramic capacitor 1 including the multilayer body 10 and the external electrodes 40 is defined as dimension L, the dimension L is preferably, for example, about 0.1 mm or more and about 0.8 mm or less. When the dimension in the width direction between the first lateral surface WS1 and the second lateral surface WS2 of the multilayer ceramic capacitor 1 is defined as dimension W, the dimension W is preferably, for example, about 0.2 mm or more and about 1.6 mm or less. When the dimension in the height direction between the first main surface TS1 and the second main surface TS2 of the multilayer ceramic capacitor 1 is defined as dimension T, the dimension T is preferably, for example, about 0.05 mm or more and about 0.2 mm or less. The dimension L in the length direction of the multilayer ceramic capacitor 1 of a preferred embodiment of the present invention is smaller than the dimension W in the width direction of the multilayer ceramic capacitor 1. In a preferred embodiment of the present invention, the height direction between the first main surface TS1 and the second main surface TS2 of the multilayer ceramic capacitor 1 corresponds to the lamination (stacking) direction of the dielectric layers 20 and the internal electrode layers 30.

As described above, according to the multilayer ceramic capacitor 1 of a preferred embodiment of the present invention, in the LW reversed multilayer ceramic capacitor, the opening portion H at which the surface of the multilayer body 10 is exposed is provided in each of the fourth surface portion 40A4 and the fifth surface portion 40A5 of the first external electrode 40A, and each of the ninth surface portion 40B4 and the tenth surface portion 40B5 of the second external electrode 40B. With such a configuration, it is possible to reduce or prevent deterioration of the self-alignment effect, and it is possible to perform stable mounting. In addition, the self-alignment effect refers to an effect wherein, when soldering, a force that reduces the surface area of a molten solder, i.e., the surface tension, is applied to the molten solder, such that the electronic element as a mounting target supported by the molten solder is moved, the positioning is performed. By obtaining this self-alignment effect, it is possible to reduce or prevent positional deviation at the time of mounting.

Figure 11A:
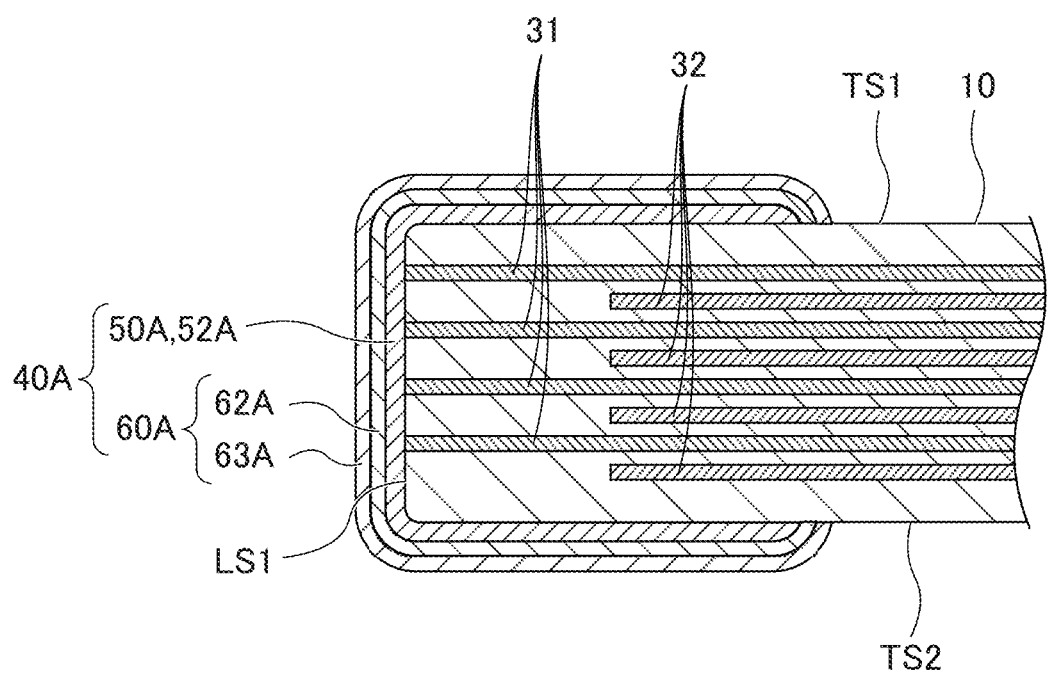
FIG. 11A is a cross-sectional view of a modified example of a layer configuration of an external electrode of the multilayer ceramic capacitor of the above preferred embodiment, and is a view corresponding to FIG. 10A.
Figure 11B:
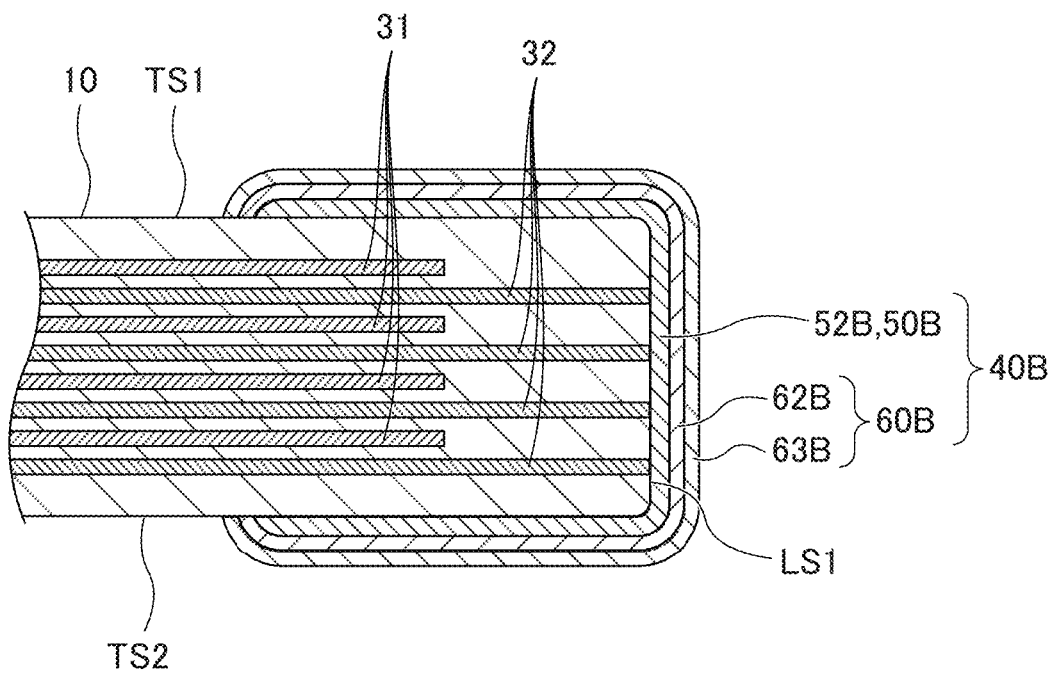
FIG. 11B is a cross-sectional view showing a modified example of a layer configuration of an external electrode of the multilayer ceramic capacitor of the above preferred embodiment, and is a view corresponding to FIG. 10B.

Hereinafter, a description will be given of a modified example of the layer configuration of the external electrode 40 of the multilayer ceramic capacitor 1 of a preferred embodiment of the present invention. In the following description, the same or corresponding components as those of the above preferred embodiment are denoted by the same reference numerals, and a detailed description thereof is omitted. FIGS. 11A and 11B are each a cross-sectional view showing a modified example of a layer configuration of the external electrode 40 of the multilayer ceramic capacitor 1 of a preferred embodiment of the present invention, and are views corresponding to FIGS. 10A and 10B, respectively.

In the present modified example, the configuration of the external electrode 40 differs from that of the above preferred embodiment.

The first external electrode 40A includes the first base electrode layer 50A and the first plated layer 60A. The first base electrode layer 50A of the present modified example includes a first fired layer 52A. The first plated layer 60A of the present modified example includes the first Ni plated layer 62A and the first Sn plated layer 63A.

The second external electrode 40B includes the second base electrode layer 50B and the second plated layer 60B. The second base electrode layer 50B of the present modified example includes a second fired layer 52B. The second plated layer 60B of the modified example includes the second Ni plated layer 62B and the second Sn plated layer 63B.

In the present modified example, for example, similarly to the first external electrode 40A described above, the first base electrode layer 50A includes the first surface portion located on the first end surface LS1, the second surface portion located on a portion of the first main surface TS1, the third surface portion located on a portion of the second main surface TS2, the fourth surface portion located on a portion of the first lateral surface WS1, and the fifth surface portion located on a portion of the second lateral surface WS2. Opening portions corresponding to the opening portions H are provided in the fourth surface portion and the fifth surface portion of the first base electrode layer 50A. In the present modified example, the first base electrode layer 50A is connected to the first internal electrode layers 31.

The first Ni plated layer 62A covers the first base electrode layer 50A. The first Sn plated layer 63A covers the first Ni plated layer 62A.

In the present modified example, for example, similarly to the second external electrode 40B described above, the second base electrode layer 50B includes a sixth surface portion located on the second end surface LS2, the seventh surface portion located on a portion of the first main surface TS1, the eighth surface portion located on a portion of the second main surface TS2, the ninth surface portion located on a portion of the first lateral surface WS1, and the tenth surface portion located on a portion of the second lateral surface WS2. Opening portions corresponding to the above-mentioned opening portions H are provided in the ninth surface portion and the tenth surface portion of the second base electrode layer 50B. In this modified example, the second base electrode layer 50B is connected to the second internal electrode layers 32.

The second Ni plated layer 62B covers the second base electrode layer 50B. The second Sn plated layer 63B covers the second Ni plated layer 62B.

The first fired layer 52A of the first base electrode layer 50A and the second fired layer 52B of the second base electrode layer 50B may be obtained by, for example, applying a conductive paste containing glass and metal to a multilayer body, and firing the conductive paste. In a case of co-firing a laminate chip prior to firing and the conductive paste applied to the laminate chip, it is preferable that the fired layer is formed by firing a material to which a ceramic material instead of glass component was added. At this time, it is particularly preferable to use, as the ceramic material to be added, the same type of ceramic material as the dielectric layer 20.

In a case in which the base electrode layer is made of a fired layer, the first plated layer 60A and the second plated layer 60B preferably include a two layer structure in which a Sn plated layer is provided on Ni plated layer, for example. In such a case, the Ni plated layer prevents the base electrode layer from being eroded by the solder when mounting the multilayer ceramic capacitor 1. Furthermore, the Sn plated layer also improves the wettability of the solder when mounting the multilayer ceramic capacitor 1. With such a configuration, it is possible to easily mount the multilayer ceramic capacitor 1.

The first plated layer 60A and the second plated layer 60B are not limited to the two-layer structure, and may have a three-layer structure including, for example, a Cu-plating or may include another layer structure as in the above preferred embodiment.

The thickness per plated layer is preferably, for example, about 2 μm or more and about 15 μm or less. That is, the average thickness of each of the first Ni plated layer 62A, the first Sn plated layer 63A, the second Ni plated layer 62B, and the second Sn plated layer 63B is preferably, for example, about 2 μm or more and about 15 μm or less. More specifically, for example, it is more preferable that the average thickness of each of the first Ni plated layer 62A, the first Sn plated layer 63A, the second Ni plated layer 62B, and the second Sn plated layer 63B is about 2 μm or more and about 4 μm or less.

Next, a non-limiting example of a method of manufacturing the multilayer ceramic capacitor 1 according to a preferred embodiment of the present invention will be described.

A dielectric sheet for the dielectric layer 20 and a conductive paste for the internal electrode layer 30 are provided. The conductive paste for the dielectric sheet and the internal electrode includes a binder and a solvent. A known binder and solvent may be used. A paste made of a conductive material is, for example, one made by an organic binder and an organic solvent being added to a metal powder.

A conductive paste for the internal electrode layer 30 is printed on the dielectric sheet using a printing plate that is patterned to form the shape of the internal electrode layer 30 of a preferred embodiment of the present invention by, for example, screen printing, gravure printing, or the like. Thus, the dielectric sheet on which the pattern of the first internal electrode layer 31 is provided, and the dielectric sheet on which the pattern of the second internal electrode layer 32 is provided are prepared. Here, it is possible to adjust the sizes of the opening portions H by controlling the interval between the first extension portion 31B, and the second extension portion 31C and the third extension portion 31D, and the interval between the fourth extension portion 32B, and the fifth extension portion 32C and the sixth extension portion 32D.

A predetermined number of dielectric sheets on which the pattern of the internal electrode layer is not printed are laminated such that a portion is formed which defines and functions as the first main surface-side outer layer portion 12 on the first main surface TS1 side. On top of that, the dielectric sheet on which the pattern of the first internal electrode layer 31 is printed and the dielectric sheet on which the pattern of the second internal electrode layer 32 is printed are sequentially laminated alternately, such that a portion is formed which defines and functions as the inner layer portion 11. On this portion defining and functioning as the inner layer portion 11, a predetermined number of dielectric sheets in which the pattern of the internal electrode layer is not printed are laminated, such that a portion is formed which defines and functions as the second main surface-side outer layer portion 13 on the second main surface TS2 side. Thus, a laminated sheet is produced.

The laminated sheet is pressed in the lamination direction by hydrostatic pressing, for example, such that a laminated block is produced.

The laminated block is cut to a predetermined size, such that laminate chips are cut out. At this time, corners and ridges of the laminate chips may be rounded by barrel polishing or the like.

The laminate chip is fired to produce the multilayer body 10. The firing temperature depends on the materials of the dielectric layers 20 and the internal electrode layers 30, however, it is preferably about 900° C. or more and about 1400° C. or less, for example.

In a preferred embodiment of the present invention, the base electrode layer is composed of a thin film layer. When forming the base electrode layer by a thin film layer, a thin film layer is formed at a portion where the external electrode of the multilayer body 10 is to be formed, by performing masking or other processing, for example. The thin film layer is formed by a thin film forming method such as a sputtering method or a deposition method, for example. In a preferred embodiment of the present invention, a sputtering electrode as a thin film layer is formed by the sputtering method.

Figure 12:
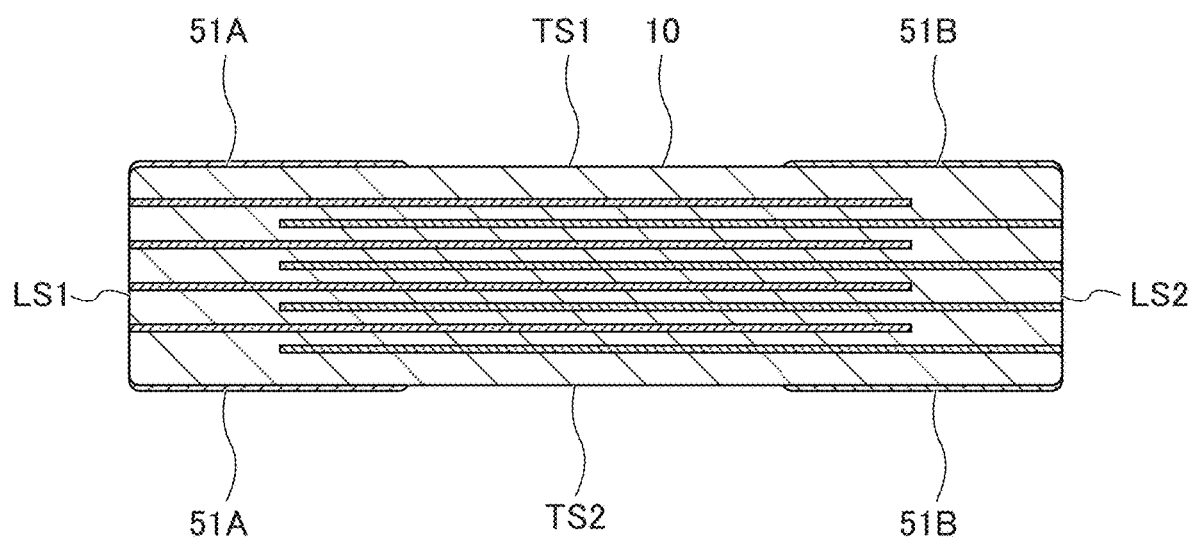
FIG. 12 is a diagram of an intermediate state in the manufacturing processing of the multilayer ceramic capacitor of the above preferred embodiment.
Figure 13:
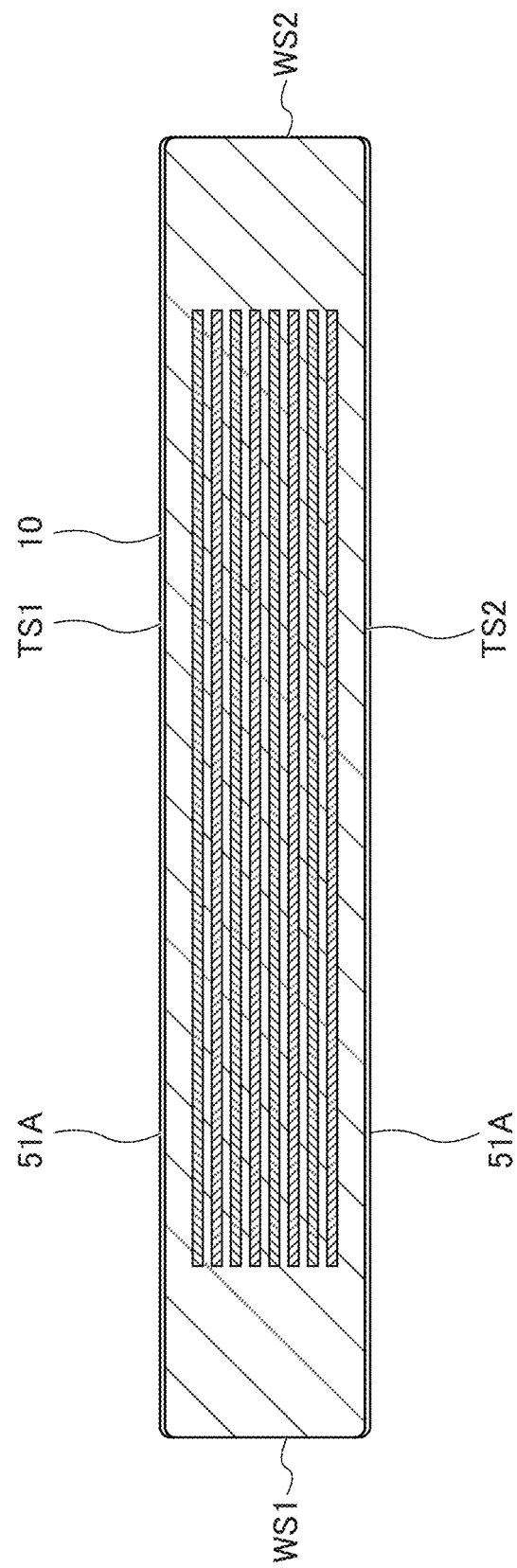
FIG. 13 is a diagram of an intermediate state in the manufacturing processing of the multilayer ceramic capacitor of the above preferred embodiment.
Figure 14:
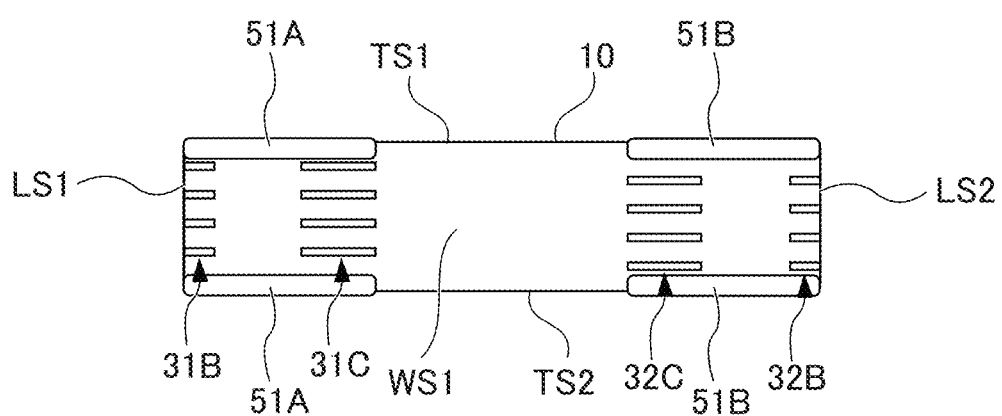
FIG. 14 is a diagram of an intermediate state in the manufacturing processing of the multilayer ceramic capacitor of the above preferred embodiment.

FIGS. 12 to 14 are each a view of an intermediate state in the manufacturing processing of the multilayer ceramic capacitor of a preferred embodiment of the present invention, and a view showing a state after the thin film layer is provided on the multilayer body 10 and before the plated layer is provided. FIG. 12 is a view of a condition in which the first thin film layer 51A and the second thin film layer 51B as a thin film layer are provided on the multilayer body 10, and corresponds to the LT cross section of FIG. 6. FIG. 13 is a view of a condition in which the first thin film layer 51A defining and functioning as a thin film is provided on the multilayer body 10, and corresponds to the WT cross section of FIG. 7. FIG. 14 is a view of a condition in which the first thin film layer 51A and the second thin film layer 51B are provided on the multilayer body 10, and corresponds to FIG. 9 and shows a surface of the first lateral surface WS1 of the multilayer body 10.

The first thin film layer 51A including a sputtering electrode is provided on a portion of the first main surface TS1 on the first end surface LS1 side and a portion of the second main surface TS2 on first end surface LS1 side. The second thin film layer 51B including a sputtering electrode is provided on a portion of the first main surface TS1 on the second end surface LS2 side and a portion of the second main surface TS2 on the second end surface LS2 side.

In a preferred embodiment of the present invention, the thin film layer including a sputtering electrode is provided on a portion of the first main surface TS1 and on a portion of the second main surface TS2, and a portion of the first lateral surface WS1 and on a portion of the second lateral surface WS2 in a manner surrounding or somewhat surrounding the portion of the first lateral surface WS1 and the portion of the second lateral surface WS2 continuously from the portion of the first main surface TS1 and the portion of the second main surface TS2. With such a configuration, it is possible to control the distance between the thin film layer provided on a portion of the first lateral surface WS1 and on a portion of the second lateral surface WS2, and the internal electrode layers exposed on the first lateral surface WS1 and the second lateral surface WS2. Thus, it is possible to deposit a plated layer even on the surface of the multilayer body 10 between the thin film layer provided on the portion of the first lateral surface WS1 and the portion of the second lateral surface WS2, and the internal electrode layers exposed on the first lateral surface WS1 and the second lateral surface WS2.

Thereafter, a plated layer is formed on the surfaces of the base electrode layer made of the thin film layer and the multilayer body. In a preferred embodiment of the present invention, as the plated layer, three plated layers including, for example, a Cu plated layer, a Ni plated layer, and a Sn plated layer are formed.

The plated layer is formed by, for example, an electrolytic plating method. Barrel plating is preferably used as the plating method.

Here, in a case of providing the thin film layer to surround a portion of the first lateral surface WS1 and a portion of the second lateral surface WS2, it is possible to control the distance between the thin film layer and the internal electrode layers exposed on the first lateral surface WS1 and on the second lateral surface WS2 of the multilayer body 10. Thus, it is possible to deposit a plated layer even on the surface of the multilayer body 10 between the thin film layer provided on the portion of the first lateral surface WS1 and the portion of the second lateral surface WS2, and the internal electrode layers exposed on the first lateral surface WS1 and the second lateral surface WS2.

Furthermore, the plated layer covers portions of the first lateral surface WS1 and the second lateral surface WS2 of the multilayer body 10 at which the internal electrode layers 30 are exposed. At this time, the gap between the thin film layer and the internal electrode layer exposed on the surface of multilayer body 10, and the gaps between the plurality of internal electrode layers 30 exposed on the surface of multilayer body 10 are made narrow. Therefore, a plated layer is also deposited on the regions of these gaps. With such a configuration, the plated layers are provided on the portions except for the opening portions H of a preferred embodiment of the present invention.

In addition, for example, when the area of the opening portion H is small and it is difficult to control the formation of the plated layer, masking may be performed at a location where the opening portion is to be provided to form a plated layer. This makes it easier to form the opening portion H.

When the base electrode layer is formed by a fired layer, on the first end surface LS1 side of the multilayer body 10, a conductive paste defining and functioning as the first base electrode layer is applied to the first surface portion located on the first end surface LS1, the second surface portion located on a portion of first main surface TS1, the third surface portion located on a portion of second main surface TS2, the fourth surface portion located on a portion of the first lateral surface WS1, and the fifth surface portion located on a portion of the second lateral surface WS2 of the multilayer body 10. Furthermore, on the second end surface LS2 side of the multilayer body 10, a conductive paste defining and functioning as the second base electrode layer is applied to the sixth surface portion located on the second end surface LS2, the seventh surface portion located on a portion of the first main surface TS1, the eighth surface portion located on a portion of the second main surface TS2, the ninth surface portion located on a portion of the first lateral surface WS1, and the tenth surface portion located on a portion of the second lateral surface WS2 of the multilayer body 10.

Masking, etc. may be performed in advance for a portion where it is not desired to provide a base electrode layer such as a portion corresponding to the opening portion H. After masking, a conductive paste containing a glass component and metal is applied to the multilayer body 10 by, for example, a method such as dipping or screen printing. Thereafter, firing processing is performed to form a base electrode layer. The temperature of the firing processing at this time is preferably, for example, about 700° C. or higher and about 900° C. or less.

In a case of co-firing a laminate chip prior to firing and the conductive paste applied to the laminate chip, it is preferable that the fired layer is formed by firing a material to which a ceramic material instead of glass component is added. At this time, it is particularly preferable to use, as the ceramic material to be added, the same type of ceramic material as the dielectric layer 20. In this case, the multilayer body 10 including a fired layer therein is obtained by applying the conductive paste to the laminate chip prior to firing, and co-firing the laminate chip and the conductive paste applied to the laminate chip.

Thereafter, a plated layer is formed on the surface of the base electrode layer composed of the fired layer and the multilayer body 10. When the base electrode layer is composed of a fired layer, for example, a two-layer plated layer including a Ni plated layer and a Sn plated layer is formed. The plated layer is formed by, for example, an electrolytic plating method. Barrel plating is preferably used for the plating method.

In addition, for example, when the area of the opening portion H is small and it is difficult to control the formation of the plated layer, masking may be performed at a location where the opening portion is to be provided to form a plated layer. This makes it easier to form the opening portion H.

The multilayer ceramic capacitor 1 is manufactured according to such a manufacturing process.

Figure 15:
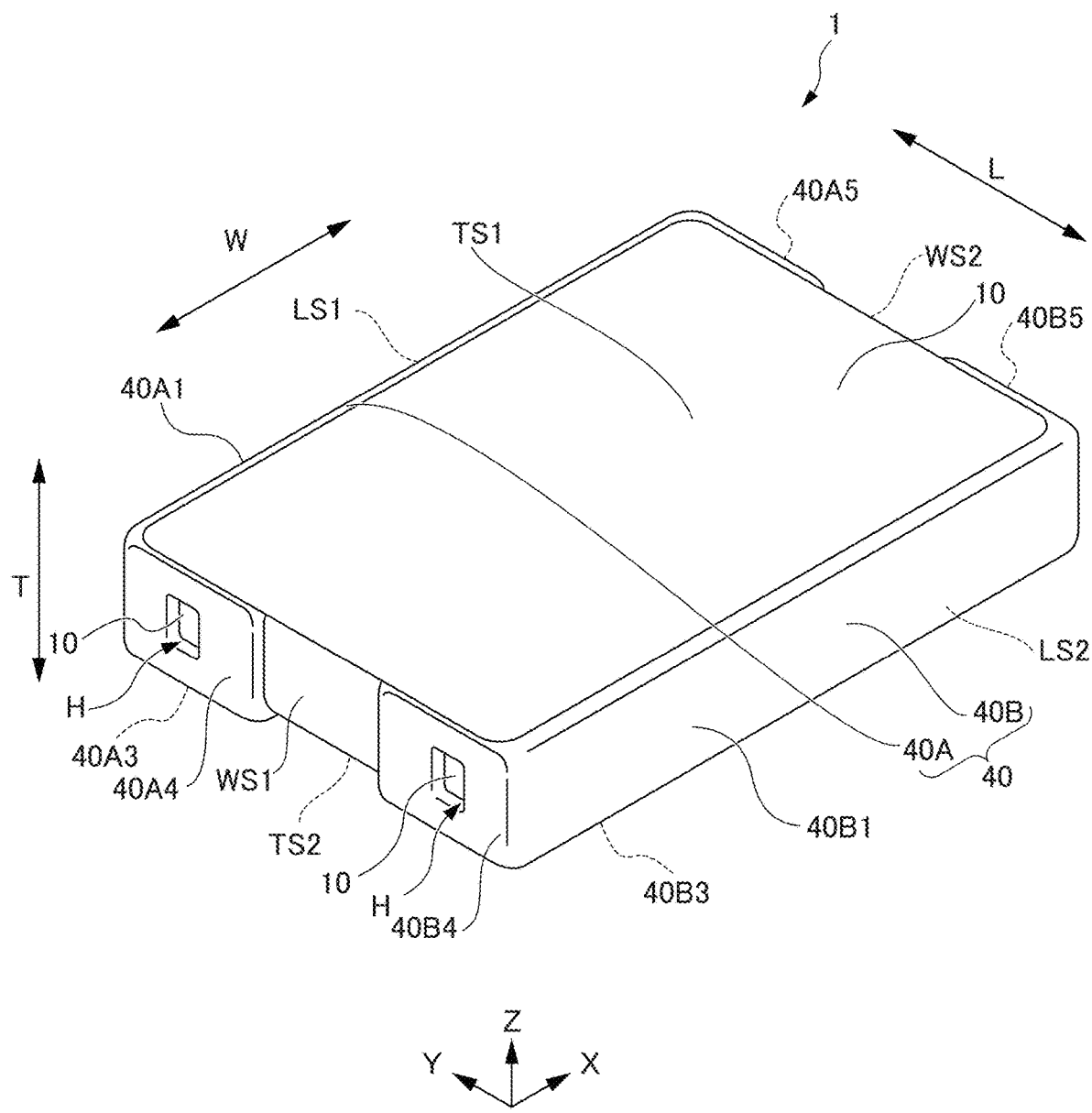
FIG. 15 is a cross-sectional view of a modified example of a positional arrangement of the external electrode of the multilayer ceramic capacitor of the above preferred embodiment, and is a view corresponding to FIG. 1.

In addition, the configuration of the external electrode 40 is not limited to the above-described configurations. Hereinafter, descriptions are provided of modified examples in relation to the positional arrangement of the external electrode 40 of the multilayer ceramic capacitor 1 of a preferred embodiment of the present invention. In the following description, the same or corresponding components as those of the above preferred embodiment are denoted by the same reference numerals, and a detailed description thereof is omitted. FIG. 15 is a cross-sectional view showing a modified example of the positional arrangement of the external electrode 40 of the multilayer ceramic capacitor 1 of a preferred embodiment of the present invention, and is a view corresponding to FIG. 1.

In the present modified example, the positional arrangement of the external electrode 40 differs from that of the above-described preferred embodiment. In the present modified example, the first external electrode 40A and the second external electrode 40B are provided on only one of the first main surface TS1 and the second main surface TS2.

For example, the first external electrode 40A of the present modified example includes the first surface portion 40A1 located on the first end surface LS1, the third surface portion 40A3 located on a portion of the second main surface TS2, the fourth surface portion 40A4 located on a portion of the first lateral surface WS1, and the fifth surface portion 40A5 located on a portion of the second lateral surface WS2. That is, the first external electrode 40A of the present modified example is not provided on the first main surface TS1.

For example, the second external electrode 40B of the present modified example includes the sixth surface portion 40B1 located on the second end surface LS2, the eighth surface portion 40B3 located on a portion of the second main surface TS2, the ninth surface portion 40B4 located on a portion of the first lateral surface WS1, and the tenth surface portion 40B5 located on a portion of the second lateral surface WS2. That is, the second external electrode 40B of the present modified example is not provided on the first main surface TS1.

Furthermore, similarly to the above-described preferred embodiments, the opening portions H at which the surfaces of the multilayer body 10 are exposed on the fourth surface portion 40A4 and the fifth surface portion 40A5 of the first external electrode 40A, and the ninth surface portion 40B4 and the tenth surface portion 40B5 of the second external electrode 40B of the present modified example.

Even with such a configuration, it is possible to reduce or prevent deterioration of the self-alignment effect, and it is possible to perform stable mounting. Furthermore, by not providing the first external electrode 40A and the second external electrode 40B on either the first main surface TS1 or the second main surface TS2, it is possible to reduce the dimension of the multilayer ceramic capacitor 1 in the height direction T, and it is possible to achieve a reduced height of the multilayer ceramic capacitor 1. In addition, by not providing the first external electrode 40A and the second external electrode 40B on either the first main surface TS1 or the second main surface TS2, it is possible to further secure the height of the multilayer body 10 by the thickness of the external electrode 40. Therefore, it is possible to increase the volume of the active layer portion of the multilayer body 10, and thus it is possible to achieve higher capacitance of the multilayer ceramic capacitor 1.

According to the multilayer ceramic capacitor 1 of a preferred embodiment of the present invention, the following advantageous effects are obtained.

(1) The multilayer ceramic capacitor 1 of a preferred embodiment of the present invention includes the multilayer body 10 including the plurality of laminated dielectric layers 20 and the plurality of internal electrode layers 30 laminated on the dielectric layers 20, the multilayer body 10 further including the first main surface TS1 and the second main surface TS2 which oppose each other in the height direction, the first end surface LS1 and the second end surface LS2 which oppose each other in the length direction perpendicular or substantially perpendicular to the height direction, and the first lateral surface WS1 and the second lateral surface WS2 which oppose each other in the width direction perpendicular or substantially perpendicular to the height direction and the length direction, the first external electrode 40A including the first surface portion 40A1 located on the first end surface LS1, at least one of the second surface portion 40A2 located on a portion of the first main surface TS1 and the third surface portion 40A3 located on a portion of the second main surface TS2, the fourth surface portion 40A4 located on a portion of the first lateral surface WS1, and the fifth surface portion 40A5 located on a portion of the second lateral surface WS2, and the second external electrode 40B including the sixth surface portion 40B1 located on the second end surface LS2, at least one selected from the seventh surface portion 40B2 located on a portion of the first main surface TS1 and the eighth surface portion 40B3 located on a portion of the second main surface TS2, the ninth surface portion 40B4 located on a portion of the first lateral surface WS1, and the tenth surface portion 40B5 located on a portion of the second lateral surface WS2, in which, in a case in which a dimension in the length direction between the first end surface LS1 and the second end surface LS2 of the multilayer body 10 is defined as l, a dimension in the width direction between the first lateral surface WS1 and the second lateral surface WS2 of the multilayer body 10 is defined as w, and a dimension in the height direction between the first main surface TS1 and the second main surface TS2 of the multilayer body 10 is defined as t, a dimensional relationship is satisfied as w>l>t, and the fourth surface portion 40A4, the fifth surface portion 40A5, the ninth surface portion 40B4, and the tenth surface portion 40B5 each include the opening portion H at which a surface of the multilayer body 10 is exposed. With such a configuration, it is possible to provide LW reversed type multilayer ceramic capacitors that are each able to reduce or prevent deterioration of self-alignment effect and perform stable mounting.

(2) In the multilayer ceramic capacitor according to a preferred embodiment of the present invention, the opening portion H is located in the middle or approximate middle in the height direction of each of the fourth surface portion 40A4, the fifth surface portion 40A5, the ninth surface portion 40B4, and the tenth surface portion 40B5. With such a configuration, the solder is spread appropriately so as to surround the opening portion H.

(3) In the multilayer ceramic capacitor 1 according to a preferred embodiment of the present invention, the opening portion H provided in each of the fourth surface portion 40A4 and the fifth surface portion 40A5 is located more towards to the first end surface LS1 than in the middle or approximate middle in the length direction of each of the fourth surface portion 40A4 and the fifth surface portion 40A5, and the opening portion H provided in each of the ninth surface portion 40B4 and the tenth surface portion 40B5 is located more towards the second end surface than in the middle in the length direction of each of the ninth surface portion 40B4 and the tenth surface portion 40B5. With such a configuration, it is possible to appropriately secure the area in which the solder is spread on both sides of the opening portion H.

(4) In the multilayer ceramic capacitor 1 according to a preferred embodiment of the present invention, an area of the opening portion H is about 3% or more and about 20% or less with respect to an area of each of the fourth surface portion 40A4, the fifth surface portion 40A5, the ninth surface portion 40B4, and the tenth surface portion 40B5 at each of which the opening portion H is provided. With such a configuration, it is possible to obtain the self-alignment effect, and thus it is possible to more effectively achieve the advantageous effect of reducing tilting of the multilayer ceramic capacitor 1 or preventing the multilayer ceramic capacitor 1 from tilting, and reducing the rotation of the multilayer ceramic capacitor 1 that causes a short-circuit failure, or preventing the multilayer ceramic capacitor 1 from rotating to cause a short-circuit failure.

(5) In the multilayer ceramic capacitor 1 according to a preferred embodiment of the present invention, a dimension in the height direction between the first main surface TS1 and the second main surface TS2 of the multilayer body 10 is about 150 µm or less. It is possible to appropriately achieve the advantageous effects of a preferred embodiment of the present invention in a multilayer ceramic capacitor with a reduced height.

(6) In the multilayer ceramic capacitor 1 according to a preferred embodiment of the present invention, a dimension in the height direction between the first main surface and the second main surface of the multilayer body is about 100 µm or less. It is possible to appropriately achieve the advantageous effects of a preferred embodiment of the present invention in a multilayer ceramic capacitor with a reduced height.

(7) In the multilayer ceramic capacitor 1 according to a preferred embodiment of the present invention, a dimension in the height direction between the first main surface and the second main surface of the multilayer body is about 50 µm or less. It is possible to appropriately achieve the advantageous effects of a preferred embodiment of the present invention in a multilayer ceramic capacitor with a reduced height.

(8) In the multilayer ceramic capacitor 1 according to a preferred embodiment of the present invention, the internal electrode layers 30 each include the first internal electrode layer 31 and the second internal electrode layer 32, the first internal electrode layer 31 includes the first counter electrode portion 31A located in the multilayer body 10, the first extension portion 31B that is connected to the first counter electrode portion 31A and is exposed at the first end surface LS1, a portion of the first lateral surface WS1, and a portion of the second lateral surface WS2, the second extension portion 31C that is connected to the first counter electrode portion 31A so as to be spaced apart from the portion of the first extension portion 31B extending to the first lateral surface WS1, and exposed at a portion of the first lateral surface WS1, and the third extension portion 31D that is connected to the first counter electrode portion 31A so as to be spaced apart from the portion of the first extension portion 31B extending to the second lateral surface WS2, and exposed at a portion of the second lateral surface WS2, and the second internal electrode layer 32 includes the second counter electrode portion 32A located in the multilayer body 10, the fourth extension portion 32B that is connected to the second counter electrode portion 32A and is exposed at the second end surface LS2, a portion of the first lateral surface WS1, and a portion of the second lateral surface WS2, the fifth extension portion 32C that is connected to the second counter electrode portion 32A so as to be spaced apart from a portion of the fourth extension portion 32B extending to the first lateral surface WS1, and exposed at a portion of the first lateral surface WS1, and the sixth extension portion 32D that is connected to the second counter electrode portion 32A so as to be spaced apart from the portion of the fourth extension portion 32B extending to the second lateral surface WS2, and exposed at a portion of the second lateral surface WS2. With such a configuration, it is possible to easily provide the opening portion H at which a surface of the multilayer body 10 is exposed on each of the fourth surface portion 40A4, the fifth surface portion 40A5, the ninth surface portion 40B4, and the tenth surface portion 40B5. In addition, since it is possible to shorten the distance between the extension portion of the first internal electrode layer 31 and the extension portion of the second internal electrode layer 32, it is possible to shorten a path through which the current flows. With such a configuration, it is possible to reduce the ESL.

(9) In the multilayer ceramic capacitor 1 according to a preferred embodiment of the present invention, the first extension portion 31B, the second extension portion 31C, and the third extension portion 31D are all connected to the first external electrode 40A, and the fourth extension portion 32B, the fifth extension portion 32C, and the sixth extension portion 32D are all connected to the second external electrode. With such a configuration, it is possible to reduce the ESL while providing the opening portion H at which a surface of the multilayer body 10 is exposed on each of the fourth surface portion 40A4, the fifth surface portion 40A5, the ninth surface portion 40B4, and the tenth surface portion 40B5.

(10) In the multilayer ceramic capacitor 1 according to a preferred embodiment of the present invention, the first external electrode 40A includes the first base electrode layer 50A and the first plated layer 60A on the first base electrode layer 50A, the second external electrode 40B includes the second base electrode layer 50B and the second plated layer 60B on the second base electrode layer 50B, and the first base electrode layer 50A and the second base electrode layer 50B are each a sputtering electrode. With such a configuration, it is possible to provide thinner external electrodes. This achieves a structure that further ensures the thickness of the multilayer body 10, such that it is possible to secure the capacitance and the strength of the multilayer body 10.

EXPERIMENTAL EXAMPLES

Multilayer ceramic capacitors were produced as samples of Experimental Examples, and evaluation for mountability and evaluation for capacitance and the thickness of base electrode layer were performed.

First, as samples in the Examples, multilayer ceramic capacitors 1 having the following specifications shown in FIGS. 1 to 10B were manufactured according to the above-described manufacturing method. Furthermore, as a sample of Comparative Example 1, a multilayer ceramic capacitor 101 in which the opening portions H were not provided on an external electrode 140 (a first external electrode 140A and a second external electrode 140B) shown in FIG. 16A was produced. As a sample of Comparative Example 2, a multilayer ceramic capacitor 201 in which the opening portions H were not provided in an external electrode 240 (a first external electrode 240A and a second external electrode 240B) shown in FIG. 17A, and recess portions R each recessed from the end edge of the external electrode toward the end surface of the multilayer body 10 were provided was produced.

Figure 16A:
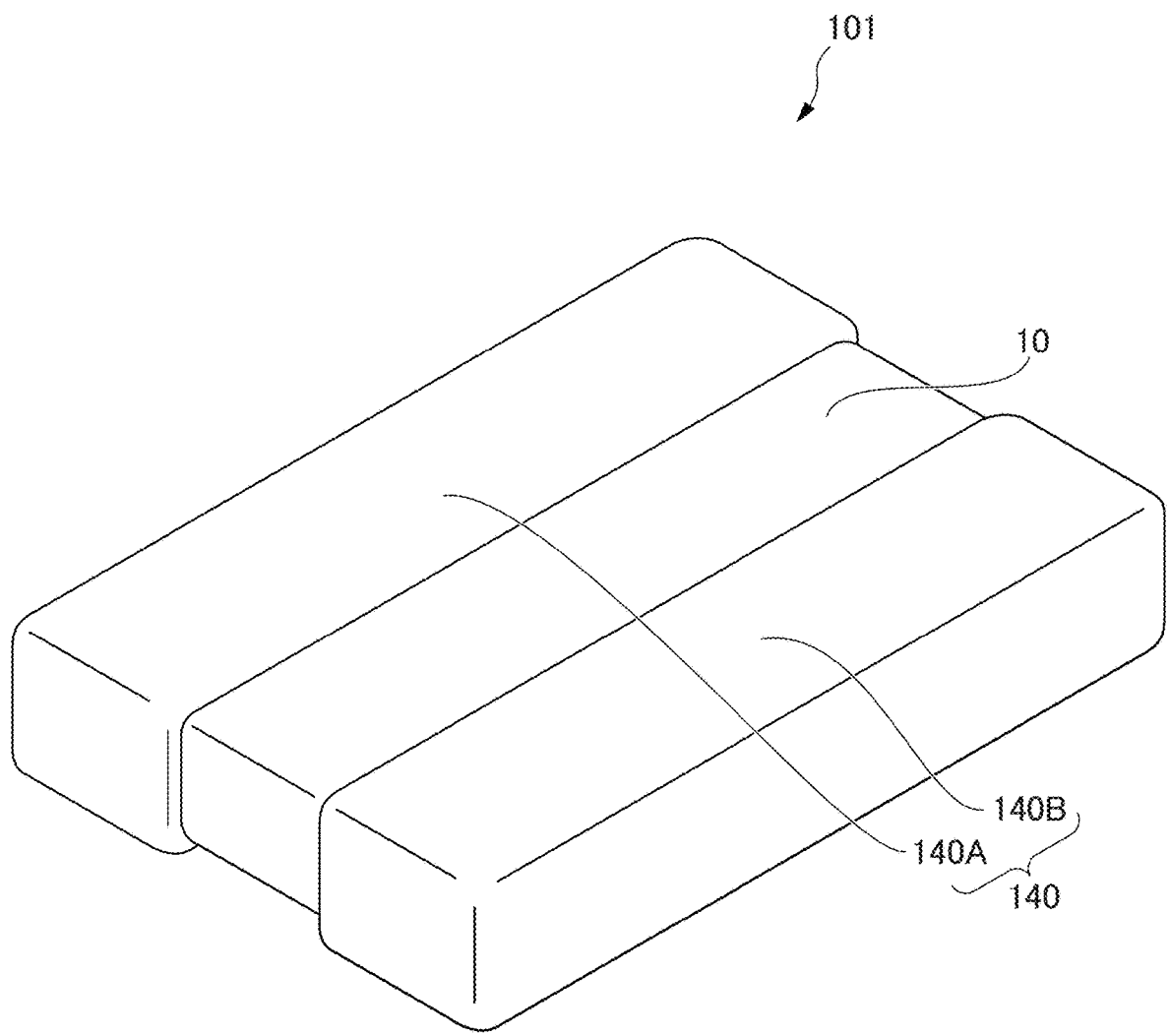
FIG. 16A is an external perspective view of a multilayer ceramic capacitor of Comparative Example 1, and is a view corresponding to FIG. 1.
Figure 16B:
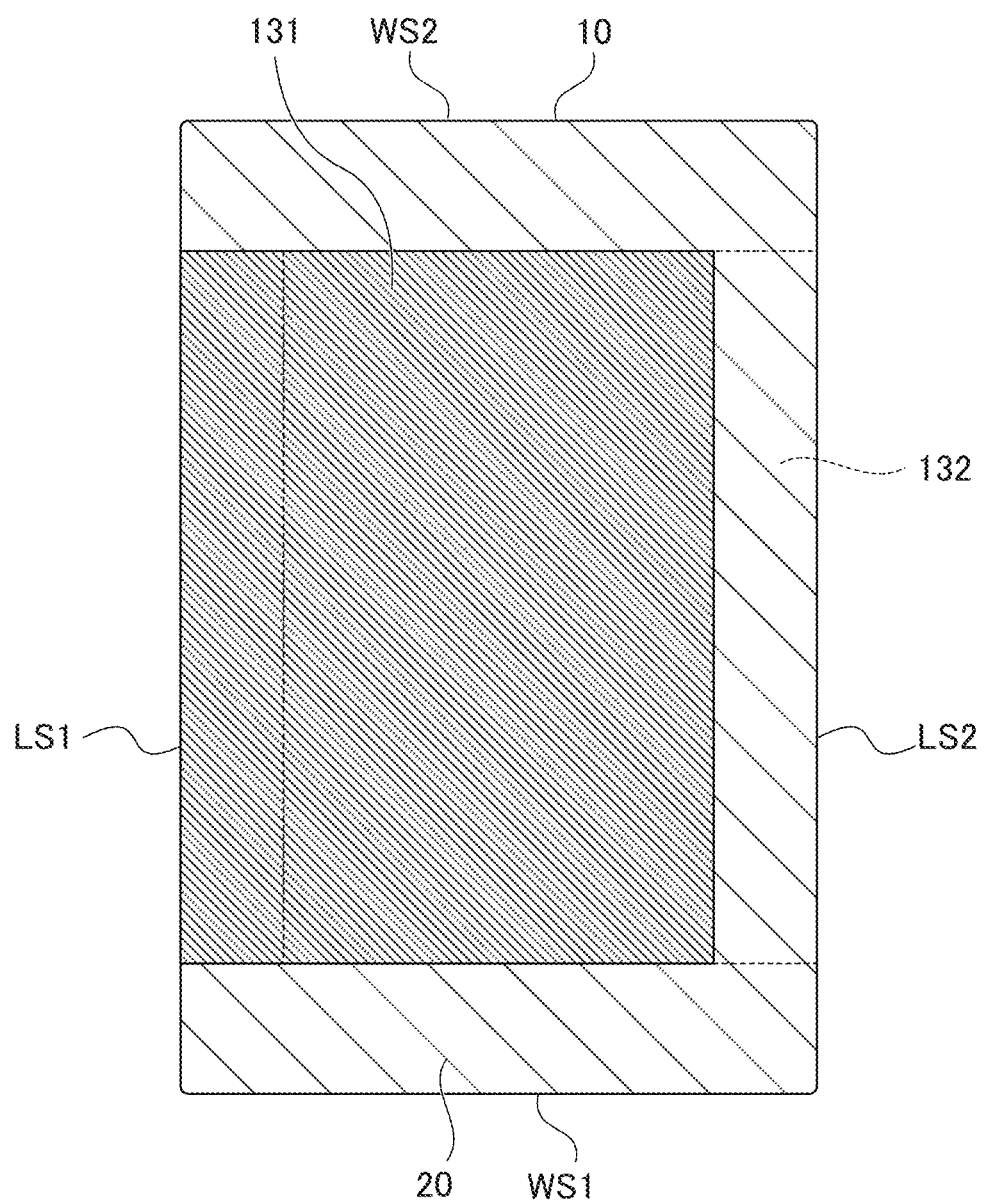
FIG. 16B is a diagram of a first internal electrode layer of the multilayer ceramic capacitor of the Comparative Example, and is a view corresponding to FIG. 8A.
Figure 16C:
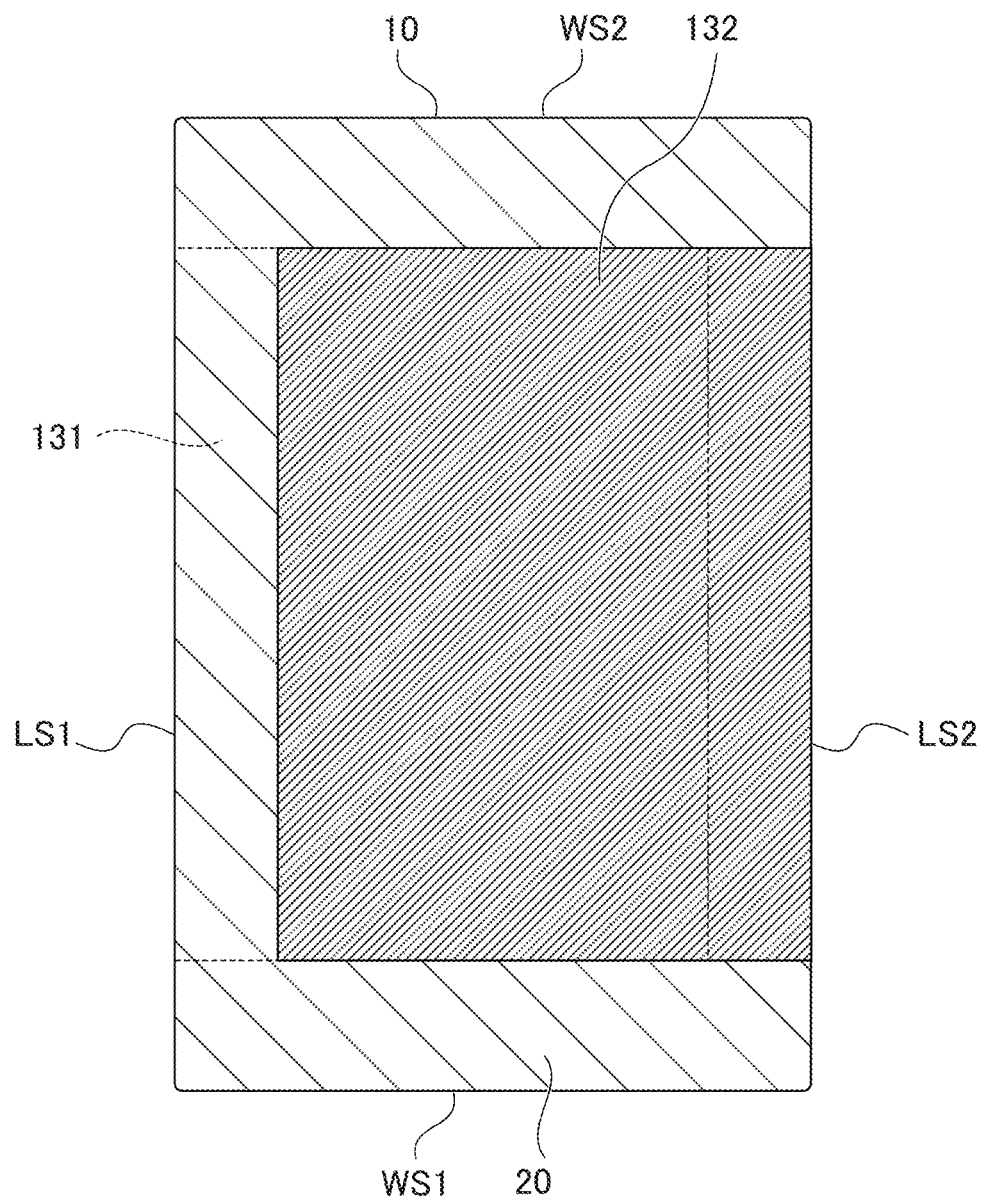
FIG. 16C is a diagram of a second internal electrode layer of the multilayer ceramic capacitor of the Comparative Example, and is a view corresponding to FIG. 8B.
Figure 17A:
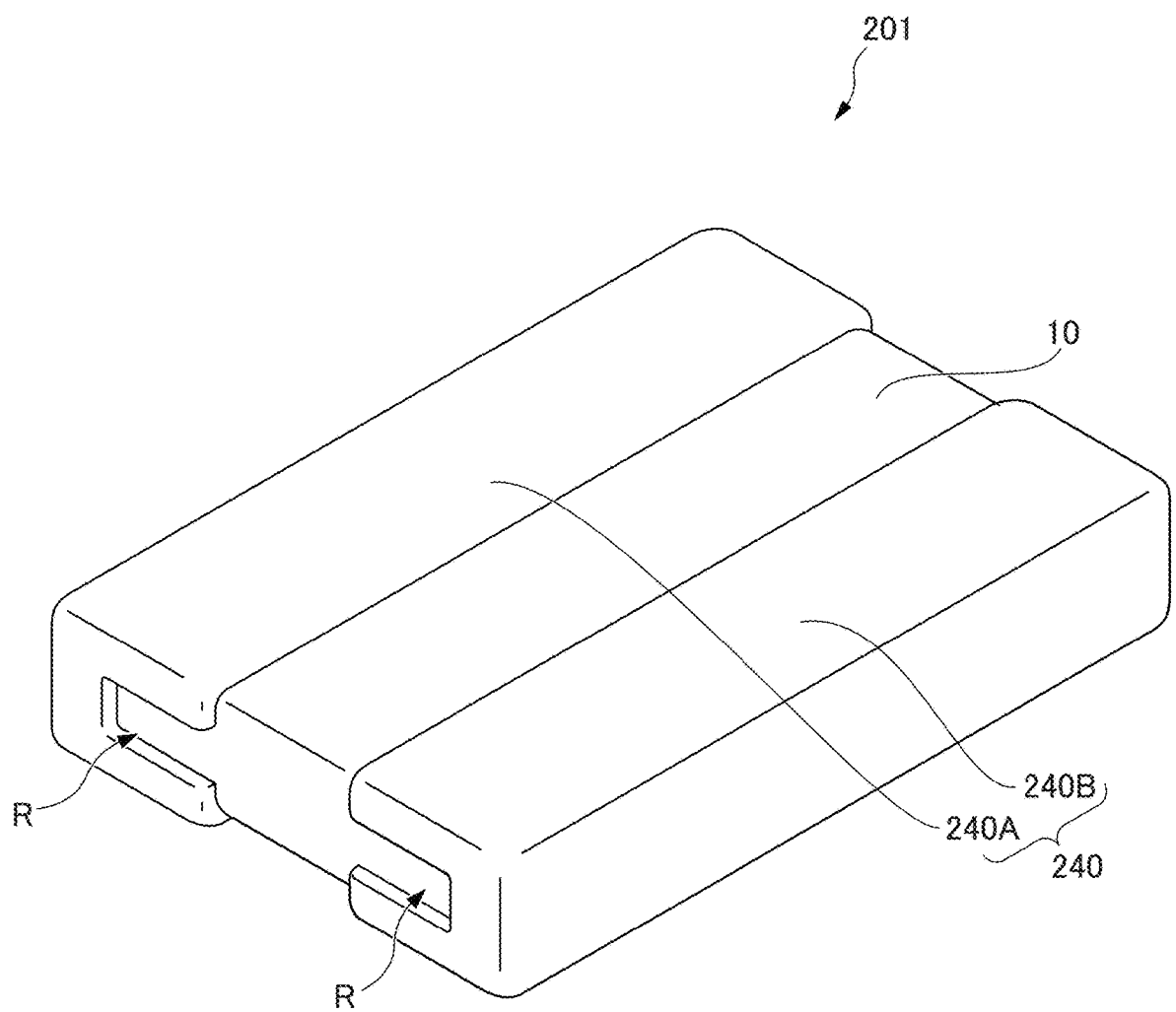
FIG. 17A is an external perspective view of a multilayer ceramic capacitor of Comparative Example 2, and is a view corresponding to FIG. 1.
Figure 17B:
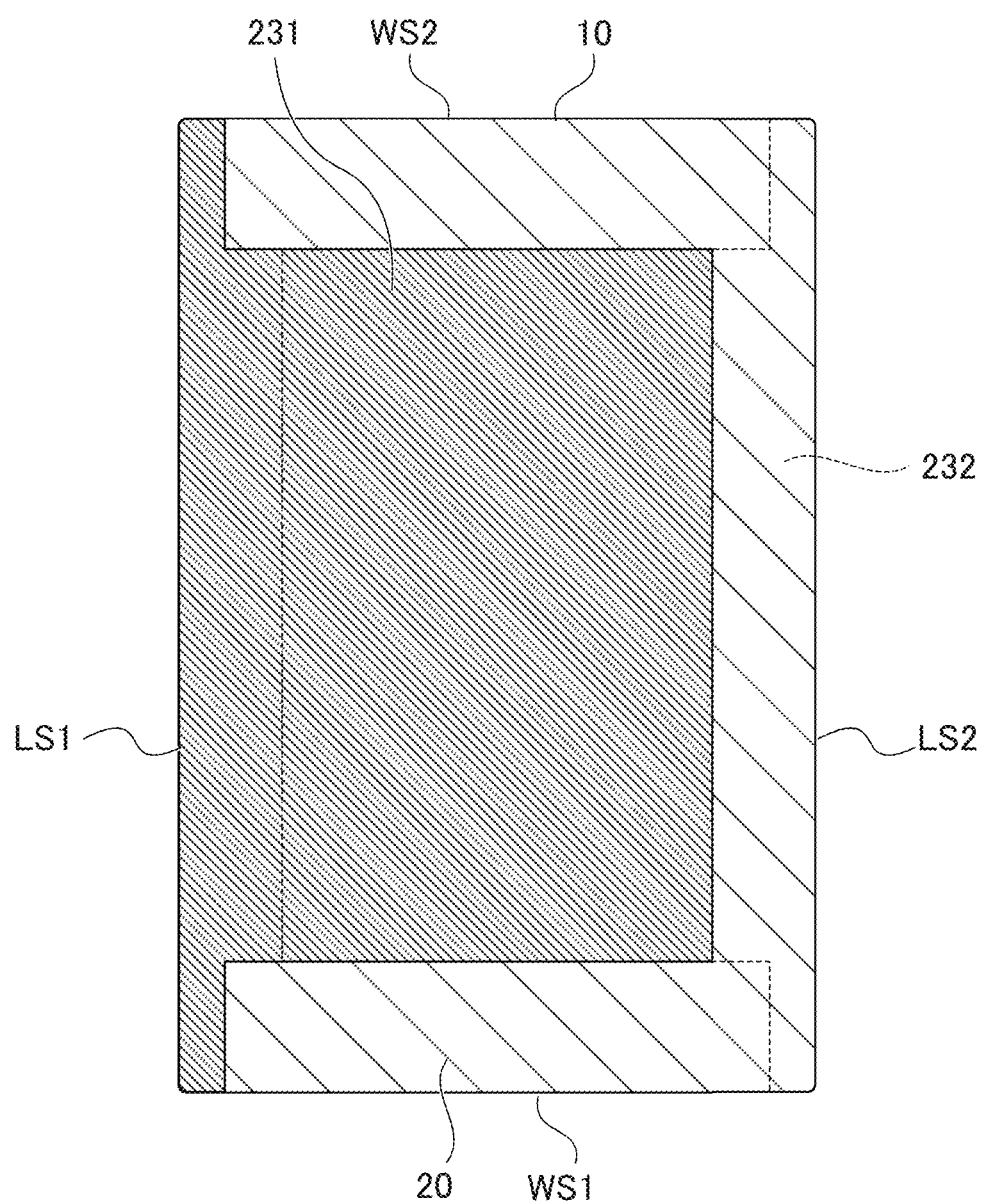
FIG. 17B is a diagram of a first internal electrode layer of the multilayer ceramic capacitor of the Comparative Example, and is a view corresponding to FIG. 8A.
Figure 17C:
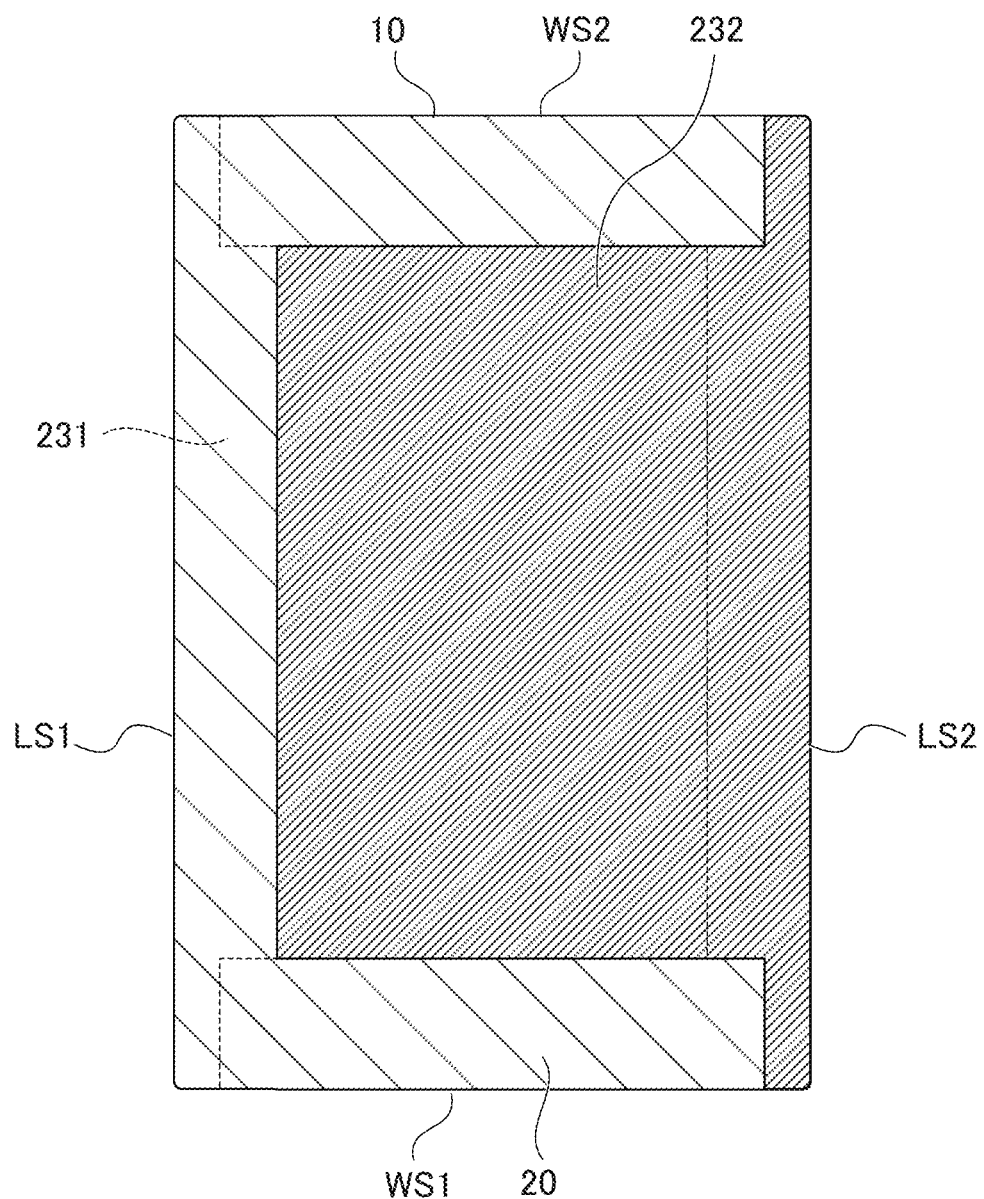
FIG. 17C is a diagram of a second internal electrode layer of the multilayer ceramic capacitor of the Comparative Example, and corresponds to FIG. 8B.

FIG. 16A is an external perspective view of the multilayer ceramic capacitor 101 of Comparative Example 1, and corresponds to FIG. 1. FIG. 16B is a view of a first internal electrode layer 131 of the multilayer ceramic capacitor 101 of Comparative Example 1, and corresponds to FIG. 8A. FIG. 16C is a view of a second internal electrode layer 132 of the multilayer ceramic capacitor 101 of Comparative Example 1, and corresponds to FIG. 8B. FIG. 17A is an external perspective view of the multilayer ceramic capacitor 201 of Comparative Example 2, and corresponds to FIG. 1. FIG. 17B is a view of a first internal electrode layer 231 of the multilayer ceramic capacitor 201 of Comparative Example 2, and corresponds to FIG. 8A. FIG. 17C is a view of a second internal electrode layer 232 of the multilayer ceramic capacitor 201 of Comparative Example 2, and corresponds to FIG. 8B. It should be noted that the external electrode is omitted in FIG. 16B, FIG. 16C, FIG. 17B, and FIG. 17C.

Configuration of Example
- Dimensions of multilayer ceramic capacitor: L×W×T=about 0.520 mm×about 1.000 mm×about 0.100 mm
- Ceramic material of dielectric layer: $BaTiO_3$
- Capacitance: about 0.47 µF
- Rated voltage: about 4 V
- Material of internal electrode layer: nickel
- Pattern of internal electrode layer: pattern shown in FIG. 8A and FIG. 8B
- Structure of External electrode:
- Base electrode layer: thin film layer (sputtering electrode)
- Material of base electrode layer: two-layer structure of NiCr layer and NiCu layer
- Thickness of base electrode layer: main surface thickness of about 0.2 µm (thickness of base electrode layer provided in each of first main surface TS1 and second main surface TS2)
- Plated layer: three-layer structure of Cu plating, Ni plating, and Sn plating
- Cu plating thickness: about 5.5 µm
- Ni plating thickness: about 2.5 µm
- Sn plating thickness: about 3.2 µm
- Area ratio of opening portion H at which a surface of the multilayer body is exposed in each of the fourth surface portion, fifth surface portion, ninth surface portion, and tenth surface portion; refer to Table 2

Configuration of Comparative Example 1
- Dimensions of multilayer ceramic capacitor: L×W×T=about 0.520 mm×about 1.000 mm×about 0.100 mm
- Ceramic material of dielectric layer: $BaTiO_3$
- Capacitance: about 0.36 µF
- Rated voltage: about 4 V
- Material of internal electrode layer: Nickel
- Pattern of internal electrode layer: pattern shown in FIG. 16B and FIG. 16C
- Structure of external electrode:
- Base electrode layer: fired layer obtained by applying conductive paste thereto and firing
- Material of base electrode layer: nickel Thickness of base electrode layer: end surface thickness of about 10 μm, lateral surface thickness of about 5 μm, main surface thickness of about 5 μm (thickness of base electrode layer provided in each of first main surface TS1 and second main surface TS2)

Plated layer: three-layer structure of Cu plating, Ni plating, and Sn plating

Cu plating thickness: about 5.5 μm

Ni plating thickness: about 2.5 μm

Sn plating thickness: about 3.2 μm

Configuration of Comparative Example 2

Dimensions of multilayer ceramic capacitor: L×W×T=about 0.520 mm×about 1.000 mm×about 0.100 mm Ceramic material of dielectric layer: $BaTiO_3$ Capacitance: about 0.47 μF Rated voltage: about 4 V Material of internal electrode layer: nickel Pattern of internal electrode layer: pattern shown in FIG. 17B and FIG. 17C Structure of external electrode:

Base electrode layer: thin film layer (sputtering electrode)

Material of base electrode layer: two layers of NiCr layer and NiCu layer

Thickness of base electrode layer: main surface thickness of about 0.2 μm (thickness of base electrode layer provided in each of first main surface TS1 and second main surface TS2)

Plated layer: three-layer structure of Cu plating, Ni plating, and Sn plating

Cu plating thickness: about 5.5 μm

Ni plating thickness: about 2.5 μm

Sn plating thickness: about 3.2 μm

Next, mountability, capacitance, and thickness of base electrode layer were evaluated using the manufactured samples.

Mountability Evaluation 1

First, mountability was evaluated using samples of the Example having an area ratio of the opening portion H of 13% and samples of Comparative Example 1 and Comparative Example 2. Evaluation was performed using 100 samples each. Table 1 shows the results of the evaluation in relation to the mountability.

TABLE 1

| | ROTATION | SHORT CIRCUIT |
|---|---|---|
| EXAMPLE | 0/100 | 0/100 |
| COMPARATIVE EXAMPLE 1 | 8/100 | 0/100 |
| COMPARATIVE EXAMPLE 2 | 15/100 | 2/100 |

In Comparative Example 1, rotation failure occurred in eight samples. The evaluation was performed by increasing the amount of solder. Therefore, it is presumed that a difference occurred in solder wetting between the first external electrode and the second external electrode such that the rotational failure occurred.

In Comparative Example 2, rotation failure occurred in fifteen samples. Two among the fifteen samples had large rotational amounts, and were mounted so as to cause one external electrode to straddle on lands having differing polarities, such that short-circuit failure occurred. In the samples of Comparative Example 2, it is presumed that, due to the formation position, thickness variation, etc. of the base electrode layer and the plated layer provided on the base electrode layer, variations occur in the area and shape of the external electrode covering the ridges of the first lateral surface portion and the second lateral surface portion of the multilayer body, such that variations in solder wetting on the external electrodes of the first lateral surface portion and the second lateral surface portion are likely to occur and there may occur a large difference in the amount of solder wetting. Consequently, it is presumed that the rotational failure occurred due to the difference in the application of the tensile stresses of the solder to the multilayer ceramic capacitor.

Mountability Evaluation 2

Next, samples of the Example in which the area ratio of the opening portion H was varied as follows were manufactured and the mountability was evaluated. Evaluation was performed using 100 samples of each. Table 2 shows the results of evaluating the mountability.

TABLE 2

| | AREA RATIO OF OPENING PORTION H(%) | ROTATION | SHORT CIRCUIT |
|---|---|---|---|
| EXAMPLE 1 | 1 | 1/100 | 0/100 |
| EXAMPLE 2 | 3 | 0/100 | 0/100 |
| EXAMPLE 3 | 8 | 0/100 | 0/100 |
| EXAMPLE 4 | 13 | 0/100 | 0/100 |
| EXAMPLE 5 | 18 | 0/100 | 0/100 |
| EXAMPLE 6 | 20 | 0/100 | 0/100 |
| EXAMPLE 7 | 25 | 1/100 | 0/100 |
| EXAMPLE 8 | 30 | 3/100 | 0/100 |
| EXAMPLE 9 | 50 | 3/100 | 0/100 |
| EXAMPLE 10 | 70 | 4/100 | 0/100 |
| EXAMPLE 11 | 90 | 4/100 | 0/100 |
| COMPARATIVE EXAMPLE 1 | — | 8/100 | 0/100 |
| COMPARATIVE EXAMPLE 2 | — | 15/100 | 2/100 |

It was confirmed that good results were obtained in the samples of the Example. In particular, it was confirmed that the area ratio of the opening portion H was preferably about 1% or more and about 50% or less, and more preferably about 3% or more and about 20% or less.

Evaluation of Thickness of Capacitance and Base Electrode Layer

Next, the capacitance and the thickness of the base electrode layer were evaluated. The evaluation results are shown in Table 3.

TABLE 3

| | CAPACITANCE | THICKNESS OF BASE ELECTRODE LAYER |
|---|---|---|
| EXAMPLE | 0.47 uF | THICKNESS OF MAIN SURFACE(T): 0.2 μm |
| COMPARATIVE EXAMPLE 1 | 0.36 uF | THICKNESS OF END SURFACE(L): 10 μm, THICKNESS OF LATERAL SURFACE(W): 5 μm, THICKNESS OF MAIN SURFACE(T): 5 μm |
| COMPARATIVE EXAMPLE 2 | 0.47 uF | THICKNESS OF MAIN SURFACE(T): 0.2 μm |

As shown in Table 3, since Comparative Example 1 has a thicker external electrode than the Example or Comparative Example 2, it is difficult to ensure the dimensions of the multilayer body, and when the multilayer ceramic capacitor is kept within the specified dimensions, the capacitance is reduced.

The evaluation method in the Experimental Example is described below.

Evaluation Method for Mountability

Figure 18A:
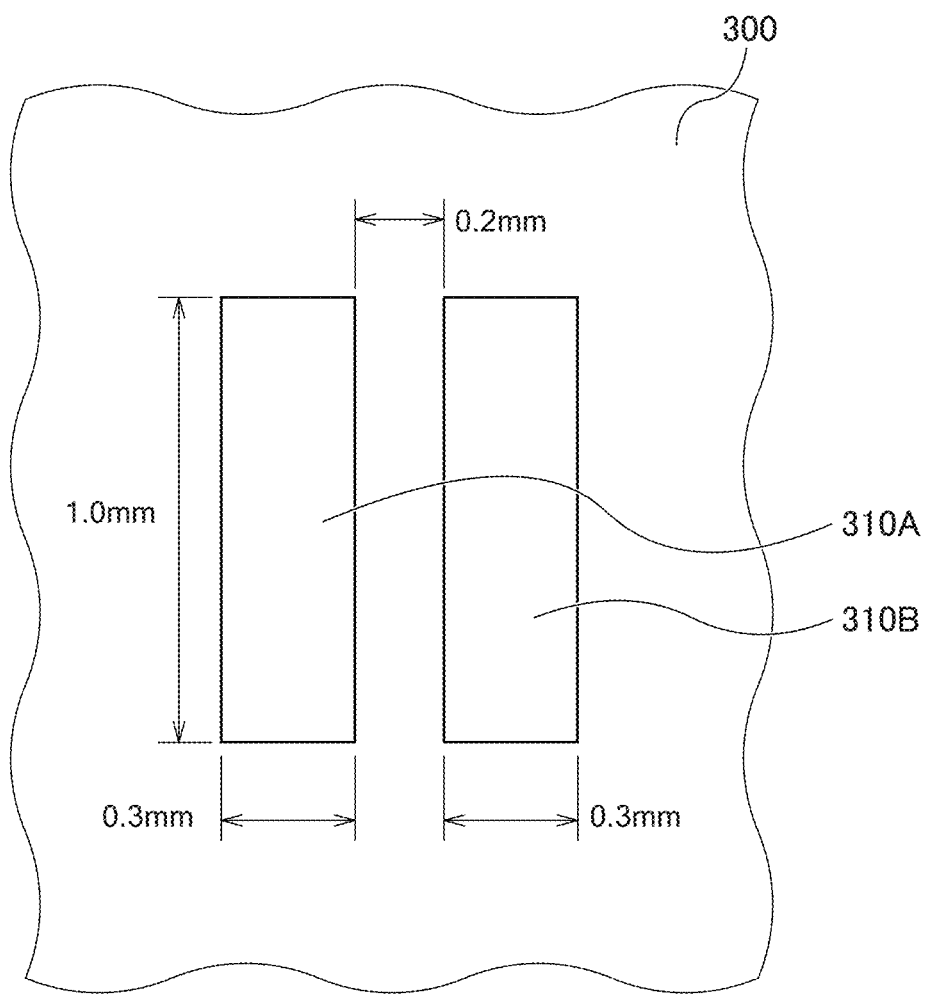
FIG. 18A is a diagram for explaining how the mountability of Experimental Example is evaluated.

FIGS. 18A to 18D are diagrams for explaining methods of evaluating the mountability. First, solder (solder composition Sn-3.0Ag-0.5Cu) was printed respectively on two lands 310A and 310B provided on a glass-epoxy substrate 300 shown in FIG. 18A. The amount of solder at this time was about 1.5 times that of the normal test in order to make the conditions more severe than those at the time of the normal test. Specifically, solder having thickness of about 150 μm was printed for each land. As shown in FIG. 18A, the length in the width direction of the land was about 1.0 mm, the length in the length direction of the land was about 0.3 mm, and the distance between the two lands was about 0.2 mm.

The multilayer ceramic capacitor was then placed on the solder-coated lands. At this time, as shown in FIG. 18B, in the middle of the land in the length of width direction, a reference line was taken so as to be perpendicular or substantially perpendicular to the width direction of the land, and the multilayer ceramic capacitor was placed so that the middle in the width direction W of the multilayer ceramic capacitor was positioned at a position about 0.1 mm away from the reference line in the width direction of the land. At this time, placing was done so that the angle θ formed by the multilayer ceramic capacitor with the land shown in FIG. 18C, that is, the angle θ formed by the acute angle between one of the opposing inner sides of the two lands and the surface on first end surface LS1 side or the second end surface LS2 side of the external electrode of the multilayer ceramic capacitor was about 5° or less.

Figure 18D:
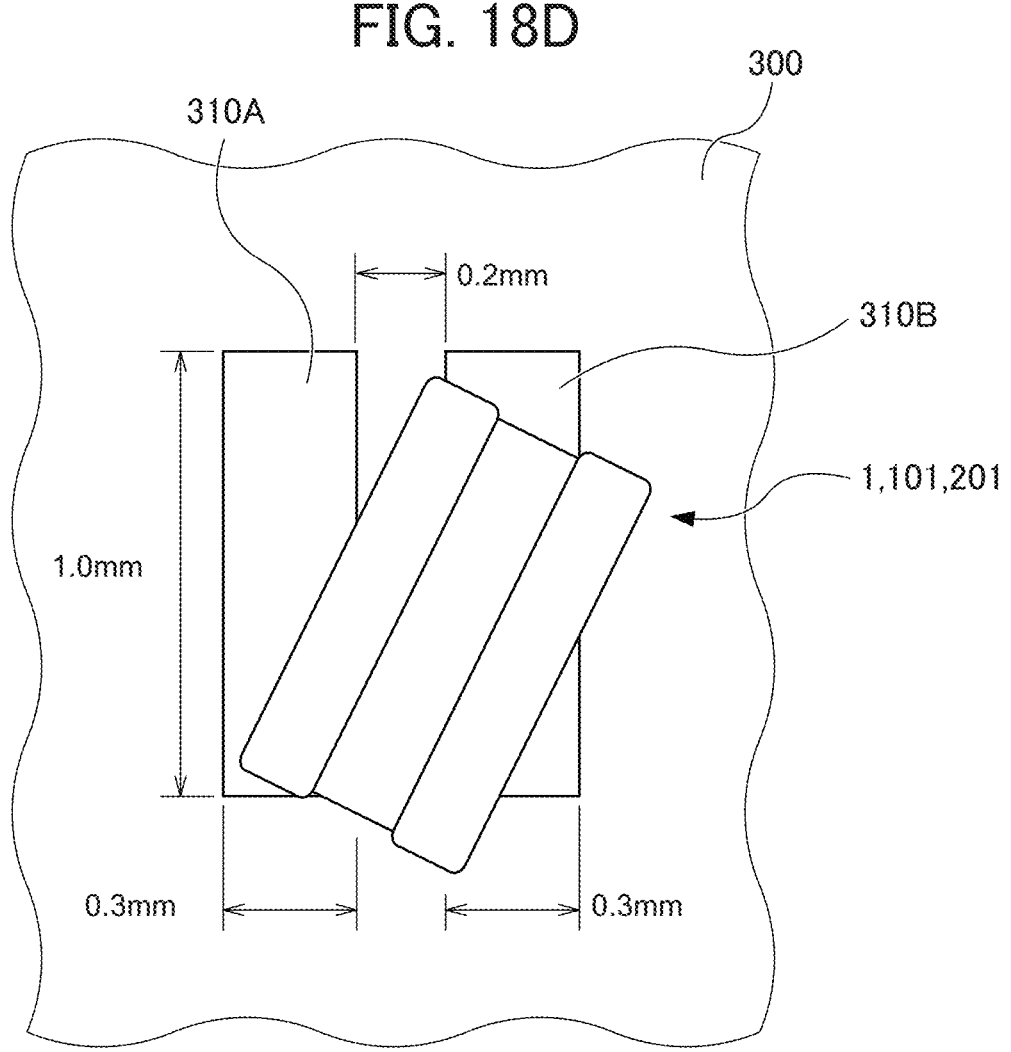
FIG. 18D is a diagram for explaining how the mountability of Experimental Example is evaluated.

Thereafter, the external electrode of the multilayer ceramic capacitor was solder-bonded to the land by reflow soldering, and the multilayer ceramic capacitor was mounted on the board. After the mounting, the mounting condition of the multilayer ceramic capacitor was observed, and the angle θ formed by the land and the multilayer ceramic capacitor was inclined by about 5° or more was evaluated as rotation failure. Furthermore, as shown in FIG. 18D, the multilayer ceramic capacitor greatly rotated and was mounted to cause the first external electrode or the second external electrode so as to straddle the two lands. This was evaluated as short-circuit failure.

Calculation of Area Ratio of Opening Portion H

The area ratio of the opening portion H was measured using an optical microscope. First, the field of view was set so that the first external electrode 40A located at the first lateral surface WS1 of the multilayer ceramic capacitor 1 is adjusted in magnification to fall within the field of view of the microscope. Next, the contour of the opening portion H was identified, and the dimension d1 in the length direction L and the dimension d2 in the height direction T of the opening portion H were measured (refer to FIG. 2). Thereafter, the area A1 of the opening portion H was calculated by the equation A1=d1×d2. Next, the contour of the first external electrode 40A was identified, and the dimension D1 in the length direction L and the dimension D2 in the height direction T of the fourth surface portion 40A4 were measured (refer to FIG. 2). Thereafter, the area A2 of the fourth surface portion 40A4 was calculated by the equation A2=D1×D2. Thereafter, the area ratio of the opening portion H located in the fourth surface portion 40A4 to the area of the fourth surface portion 40A4 was calculated by the equation A1/A2. Similarly, the area ratios of the opening portion H located at each of the fifth surface portion 40A5, the ninth surface portion 40B4, and the tenth surface portion 40B5 were also calculated. Then, the average value of the area ratios of the four opening portions H, that is, the average value of the area ratios of the opening portions H located at the fourth surface portion 40A4, the fifth surface portion 40A5, the ninth surface portion 40B4, and the tenth surface portion 40B5 was calculated as the area ratio of the opening portion H in the multilayer ceramic capacitor 1.

Measuring Method for Capacitance

The capacitance of the multilayer ceramic capacitor was measured using an LCR-meter (auto-balanced bridge-type) under conditions in which the measured voltage was about 0.5 Vrms and the measured frequency was about 1 kHz.

From the above results, according to the multilayer ceramic capacitor 1 of a preferred embodiment of the present invention, even if there is a variation in the solder amount, for example, it is possible to appropriately reduce solder wetting on the first lateral surface WS1 and the second lateral surface WS2 of the multilayer body 10, such that it is possible to reduce or prevent the stress applied in the rotational direction of the multilayer ceramic capacitor 1. Therefore, the self-alignment effect is improved, and the mountability of the multilayer ceramic capacitor 1 is stabilized. As a result, it is possible to prevent short-circuit failure.

The present invention is not limited to the configuration of the above-described preferred embodiment, and can be appropriately modified and applied without deviating from the gist of the present invention. It is to be noted that the present invention also encompasses a combination of two or more of the individual desirable configurations described in the above preferred embodiment.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a multilayer body including a plurality of laminated dielectric layers and a plurality of internal electrode layers laminated on the dielectric layers, the multilayer body further including a first main surface and a second main surface opposing each other in a height direction, a first end surface and a second end surface opposing each other in a length direction perpendicular or substantially perpendicular to the height direction, and a first lateral surface and a second lateral surface opposing each other in a width direction perpendicular or substantially perpendicular to the height direction and the length direction;
   a first external electrode including a first surface portion located on the first end surface, at least one of a second surface portion located on a portion of the first main surface and a third surface portion located on a portion of the second main surface, a fourth surface portion located on a portion of the first lateral surface, and a fifth surface portion located on a portion of the second lateral surface; and
   a second external electrode including a sixth surface portion located on the second end surface, at least one of a seventh surface portion located on a portion of the first main surface and an eighth surface portion located on a portion of the second main surface, a ninth surface portion located on a portion of the first lateral surface, and a tenth surface portion located on a portion of the second lateral surface; wherein
   when a dimension in the length direction between the first end surface and the second end surface of the multilayer body is defined as I, a dimension in the width direction between the first lateral surface and the second lateral surface of the multilayer body is defined as w, and a dimension in the height direction between the first main surface and the second main surface of the multilayer body is defined as t, a dimensional relationship of w>l>t is satisfied;
the fourth surface portion, the fifth surface portion, the ninth surface portion, and the tenth surface portion each include an opening portion at which a surface of the multilayer body is exposed; and
at least one of the opening portion of the fourth surface portion is surrounded by the fourth surface portion, the opening portion of the fifth surface portion is surrounded by the fifth surface portion, the opening portion of the ninth surface portion is surrounded by the ninth surface portion, and the opening portion of the tenth surface portion is surrounded by the tenth surface portion.

2. The multilayer ceramic capacitor according to claim 1, wherein the opening portion is located in a middle portion in the height direction of each of the fourth surface portion, the fifth surface portion, the ninth surface portion, and the tenth surface portion.

3. The multilayer ceramic capacitor according to claim 1, wherein
the opening portion in each of the fourth surface portion and the fifth surface portion is located more towards the first end surface than a middle portion in the length direction of each of the fourth surface portion and the fifth surface portion; and
the opening portion in each of the ninth surface portion and the tenth surface portion is located more towards the second end surface than the middle portion in the length direction of each of the ninth surface portion and the tenth surface portion.

4. The multilayer ceramic capacitor according to claim 1, wherein an area of the opening portion is about 3% or more and about 20% or less with respect to an area of each of the fourth surface portion, the fifth surface portion, the ninth surface portion, and the tenth surface portion at each of which the opening portion is provided.

5. The multilayer ceramic capacitor according to claim 1, wherein the dimension in the height direction between the first main surface and the second main surface of the multilayer body is about 150 μm or less.

6. The multilayer ceramic capacitor according to claim 1, wherein the dimension in the height direction between the first main surface and the second main surface of the multilayer body is about 100 μm or less.

7. The multilayer ceramic capacitor according to claim 1, wherein the dimension in the height direction between the first main surface and the second main surface of the multilayer body is about 50 μm or less.

8. The multilayer ceramic capacitor according to claim 1, wherein
the internal electrode layers each include a first internal electrode layer and a second internal electrode layer;
the first internal electrode layer includes a first counter electrode portion located in the multilayer body, a first extension portion connected to the first counter electrode portion and exposed at the first end surface, a portion of the first lateral surface, and a portion of the second lateral surface, a second extension portion connected to the first counter electrode portion so as to be spaced apart from a portion of the first extension portion extending to the first lateral surface, and exposed at a portion of the first lateral surface, and a third extension portion that is connected to the first counter electrode portion so as to be spaced apart from a portion of the first extension portion extending to the second lateral surface, and exposed at a portion of the second lateral surface; and
the second internal electrode layer includes a second counter electrode portion located in the multilayer body, a fourth extension portion connected to the second counter electrode portion and exposed at the second end surface, a portion of the first lateral surface, and a portion of the second lateral surface, a fifth extension portion connected to the second counter electrode portion so as to be spaced apart from a portion of the fourth extension portion extending to the first lateral surface, and exposed at a portion of the first lateral surface, and a sixth extension portion that is connected to the second counter electrode portion so as to be spaced apart from a portion of the fourth extension portion extending to the second lateral surface, and exposed at a portion of the second lateral surface.

9. The multilayer ceramic capacitor according to claim 8, wherein
the first extension portion, the second extension portion, and the third extension portion are all connected to the first external electrode; and
the fourth extension portion, the fifth extension portion, and the sixth extension portion are all connected to the second external electrode.

10. The multilayer ceramic capacitor according to claim 1, wherein
the first external electrode includes a first base electrode layer and a first plated layer on the first base electrode layer;
the second external electrode includes a second base electrode layer and a second plated layer on the second base electrode layer; and
the first base electrode layer and the second base electrode layer are each a sputtering electrode.

11. The multilayer ceramic capacitor according to claim 1, wherein each of the dielectric layers includes $BaTiO_3$, $CaTiO_3$, $SrTiO_3$ or $CaZrO_3$ as a main component.

12. The multilayer ceramic capacitor according to claim 11, wherein each of the dielectric layers includes a Mn compound, an Fe compound, a Cr compound, a Co compound, or a Ni compound as a sub-component.

13. The multilayer ceramic capacitor according to claim 1, wherein a thickness of each of the dielectric layers is about 0.5 μm or more and about 10 μm or less.

14. The multilayer ceramic capacitor according to claim 8, wherein a dimension in the length direction of the first extension portion exposed at the portion of the first lateral surface is about 30 μm or more and about 230 μm or less.

15. The multilayer ceramic capacitor according to claim 8, wherein a dimension in the length direction of the second extension portion exposed at the portion of the first lateral surface is about 30 μm or more and about 230 μm or less.

16. The multilayer ceramic capacitor according to claim 1, wherein each of the first and second internal electrode layers includes Ni, Cu, Ag, Pd, or Au, or an alloy including at least one of Ni, Cu, Ag, Pd, or Au.

17. The multilayer ceramic capacitor according to claim 1, wherein a thickness of each of the first and second internal electrode layers is about 0.2 μm or more and about 2.0 μm or less.

18. The multilayer ceramic capacitor according to claim 1, wherein the dimension I in the length direction from the first end surface to the second end surface of the multilayer body is about 0.05 mm or more and about 0.7 mm or less.

19. The multilayer ceramic capacitor according to claim 1, wherein the dimension w in the width direction from the first lateral surface to the second lateral surface of the multilayer body is about 0.15 mm or more and about 1.5 mm or less.

20. The multilayer ceramic capacitor according to claim 1, wherein the dimension t in the height direction from the first main surface to the second main surface of the multilayer body is about 100 μm or less.

* * * * *